United States Patent
Wang et al.

(10) Patent No.: US 10,352,134 B2
(45) Date of Patent: Jul. 16, 2019

(54) OIL OR GAS PRODUCTION USING COMPUTER SIMULATION OF OIL OR GAS FIELDS AND PRODUCTION FACILITIES

(75) Inventors: Qinghua Wang, Katy, TX (US); Graham Christopher Fleming, Houston, TX (US); Qin Lu, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 650 days.

(21) Appl. No.: 14/395,738

(22) PCT Filed: May 30, 2012

(86) PCT No.: PCT/US2012/040023
§ 371 (c)(1),
(2), (4) Date: Oct. 20, 2014

(87) PCT Pub. No.: WO2013/180709
PCT Pub. Date: Dec. 5, 2013

(65) Prior Publication Data
US 2015/0073763 A1    Mar. 12, 2015

(51) Int. Cl.
*E21B 43/00* (2006.01)
*G06Q 10/04* (2012.01)

(52) U.S. Cl.
CPC .............. *E21B 43/00* (2013.01); *G06Q 10/04* (2013.01)

(58) Field of Classification Search
CPC ................................ E21B 43/00; G06Q 10/04
USPC ......................................................... 702/10
See application file for complete search history.

(56) References Cited

U.S. PATENT DOCUMENTS

| | | | | |
|---|---|---|---|---|
| 6,230,101 B1 * | 5/2001 | Wallis | ................... | G06T 17/00 |
| | | | | 702/14 |
| 6,418,381 B1 * | 7/2002 | Fuller | ..................... | G01V 1/28 |
| | | | | 702/16 |
| 6,662,146 B1 * | 12/2003 | Watts | ..................... | E21B 49/00 |
| | | | | 703/10 |
| 2006/0036418 A1 | 2/2006 | Pita et al. | | |
| 2006/0080071 A1 | 4/2006 | Bera | | |
| 2006/0111882 A1 | 5/2006 | Subbarao | | |
| 2006/0235667 A1 * | 10/2006 | Fung | ..................... | E21B 49/00 |
| | | | | 703/10 |
| 2007/0192071 A1 | 8/2007 | Huang et al. | | |
| 2007/0255779 A1 * | 11/2007 | Watts, III | ............... | E21B 43/00 |
| | | | | 708/520 |

(Continued)

FOREIGN PATENT DOCUMENTS

WO    WO 2001/062603 A2    8/2001
WO    WO 2005/122001 A1    12/2005

OTHER PUBLICATIONS

Jiang_2007 (Techniques for Modeling Complex Reservoirs and Advanced Wells, Dissertation, Dec. 2007).*

(Continued)

*Primary Examiner* — Brian S Cook
(74) *Attorney, Agent, or Firm* — Haynes and Boone, LLP

(57) ABSTRACT

Oil or gas fields and associated facilities are computer simulated by solving linear algebraic equations using a Schwarz method with at least one well node included in the overlap. According to another aspect, equations for the wellbore nodes are processed to eliminate some non-pressure variables, e.g. component compositions. Other features are also provided.

16 Claims, 14 Drawing Sheets

(56) References Cited

U.S. PATENT DOCUMENTS

| | | | |
|---|---|---|---|
| 2007/0260333 A1* | 11/2007 | Peureux | F17D 1/04 700/28 |
| 2008/0319726 A1* | 12/2008 | Berge | E21B 41/0064 703/10 |
| 2010/0036537 A1* | 2/2010 | Bieker | G05B 13/042 700/285 |
| 2010/0082509 A1* | 4/2010 | Mishev | G06F 17/12 706/14 |
| 2010/0082724 A1* | 4/2010 | Diyankov | G06F 17/12 708/520 |
| 2010/0179436 A1* | 7/2010 | Sarfaty | A61B 5/0075 600/476 |
| 2010/0252271 A1 | 10/2010 | Kelley | |
| 2011/0040536 A1 | 2/2011 | Levitan | |
| 2011/0088898 A1 | 4/2011 | Horton et al. | |

OTHER PUBLICATIONS

Flux_Defined downloaded from https://en.wikipedia.org/wiki/Flux.*

Jiang_2007 (Techniques for Modeling Complex Reservoir and Advanced Wells, Dissertation, Dec. 2007).*

Devold_2009 (Oil and Gas production handbook: An introduction to oil and gas production, ABB, 2009).*

Devold_2009 (Oil and Gas Production Handbook : An Introduction to oil and gas production, ABB, 2009 ISBN 978-82-997886-1-8).*

Jiang_2007 (Techniques for Modeling Complex Reservoirs and Advanced Wells, Dec. 2007 Stanford University).*

Evidence that drilling, completing, and producing from an oil well is well-understood routine and conventional is provided by a Brief History of Oil and Gas Well Drilling dated Feb. 2012 downloaded from http://www.visions.az/en/news/366/4ca556e3/.*

International Search Report and the Written Opinion of the International Searching Authority, or the Declaration, dated Aug. 10, 2012, PCT/US2012/040023, 10 pages, International Searching Authority, U.S.

Russian Office Action, RU 2014147377, dated Feb. 25, 2016, 6 pages.

Canadian Office Action issued for Application No. 2,873,406, dated Oct. 4, 2016, 4 pages.

Wu, Yu-Shu, "A Virtual Node Method for Handling Well Bore Boundary Conditions in Modeling Multiphase Flow in Porous and Fractured Media," *Water Resources Research*, vol. 36, No. 3, Mar. 2000, pp. 807-814.

Canadian Office Action issued for Application No. 2,873,406, dated Jul. 11, 2017, 6 pages.

Mason et al., "Spontaneous Counter-Current Imbibition Outwards from a Hemi-Spherical Depression," *Journal of Petroleum Science and Engineering*, vol. No. 90-91, Jul. 2012, pp. 131-138.

Matthai et al., "Finite Element—Node-Centered Finite-Volume Two-Phase-Flow Experiments With Fractured Rock Represented by Unstructured Hybrid-Element Meshes," *SPE Reservoir Evaluation & Engineering*, Society of Petroleum Engineers, vol. No. 10, Issue No. 6, Dec. 1, 2007, pp. 740-756.

* cited by examiner

FIG. 5 PRIOR ART

418: Solve $F'_L(Var_{j,k,l}) = b$ to find $Var^*_{j,k,l}$

Notation below: $x = Var_{j,k,l}$, $f = F'_L$, so
solve $f(x)=b$ for x. In this example,
$x = (x1,\ldots,x1000)$
$f=(f1,\ldots,f1000)$

---

Divide $x1,\ldots,x1000$ into two overlapping groups, e.g.:
G1: $x1,\ldots,x600$
G2: $x400,\ldots,x1000$
Divide $f1,\ldots,f1000$ into two overlapping groups, e.g.:
G1': $f1,\ldots,f600$
G2': $f400,\ldots,f1000$ — 610

---

Determine initial iteration value x.sc for Schwarz iterations — 620

---

Solve G1'($x1^*,\ldots,x600^*$, x.sc601,...,x.sc1000) for $x1^*,\ldots,x600^*$. — 630

---

Solve G2'($x1,\ldots,x399$, $x400^*,\ldots,x1000^*$) for $x400^*,\ldots,x1000^*$, where $x1,\ldots,x399$ are either x.sc1,...,x.sc399 or $x1^*,\ldots,x399^*$. — 640

---

If this is the last iteration, then set $Var^* = x^*$ — 650

---

If this is not the last iteration, then set x.sc=$x^*$ for the next iteration, and return to step 630 — 660

| $\frac{\partial R}{\partial m_1}$ | $\frac{\partial R}{\partial m_2}$ | $\frac{\partial R}{\partial P}$ | $\frac{\partial R}{\partial q_{p1}}$ | $\frac{\partial R}{\partial q_{p2}}$ | $\frac{\partial R}{\partial q_{p3}}$ | $\frac{\partial R}{\partial q_{T1}}$ | $\frac{\partial R}{\partial q_{T2}}$ | $\frac{\partial R}{\partial x_{11}}$ | $\frac{\partial R}{\partial x_{21}}$ | $\frac{\partial R}{\partial P_1}$ | $\frac{\partial R}{\partial x_{12}}$ | $\frac{\partial R}{\partial x_{22}}$ | $\frac{\partial R}{\partial P_2}$ | Eq. |
|---|---|---|---|---|---|---|---|---|---|---|---|---|---|---|
| $c_{11}$ | $c_{12}$ | $c_{1p}$ | | | | | | | | | | | | (e31) |
| $c_{21}$ | $c_{22}$ | $c_{2p}$ | | 1 | | | | | | | | | | (e31) |
| $c_{31}$ | $c_{32}$ | $c_{3p}$ | | | 1 | | | | | | | | | (e31) |
| | | | | | | $\varepsilon$ | | | | -1 | | | | (e4) |
| | | | | | | | $\sum_{n=1}^{np}\sum_{k=1}^{nc} a_n \frac{\partial Q_n}{\partial q_k} x_k$ | $h_{11}$ | $h_{21}$ | 1 | $\sum_{n=1}^{np} a_n\left(\frac{\partial Q_n}{\partial q_1} - \frac{\partial Q_n}{\partial q_{nc}}\right) q_{T2}$ | $\sum_{n=1}^{np} a_n\left(\frac{\partial Q_n}{\partial q_2} - \frac{\partial Q_n}{\partial q_{nc}}\right) q_{T2}$ | | (e17) |
| | | | 1 | $-x_{11}$ | $-x_{11}$ | | | $-\sum_p^{perf}\sum_k^{nc} q_{pk}$ | | | | | | (e21) |
| | | | $-x_{21}$ | $1 - x_{21}$ | $-x_{21}$ | | | | $-\sum_p^{perf}\sum_k^{nc} q_{pk}$ | | | | | (e21) |
| | | | | 1 | 1 | -1 | | | | | | | | (e27) |
| | | | 1 | | | | | | 1 | | -1 | | | (e26) |
| | | | | | | | | 1 | | | | -1 | | (e26) |
| | | | | | | 1 | -1 | | | | | | -1 | (e27) |

Figure 7

Jacobian matrix at the network side before elimination of perforation flow rate and total connection flow rate

Figure 8

Jacobian matrix at the network side after elimination of perforation flow rate and total connection flow rate

| $\frac{\partial R}{\partial m_1}$ | $\frac{\partial R}{\partial m_2}$ | $\frac{\partial R}{\partial P}$ | $\frac{\partial R}{\partial x_{11}}$ | $\frac{\partial R}{\partial x_{21}}$ | $\frac{\partial R}{\partial P_1}$ | $\frac{\partial R}{\partial x_{12}}$ | $\frac{\partial R}{\partial x_{22}}$ | $\frac{\partial R}{\partial P_2}$ | Eq. |
|---|---|---|---|---|---|---|---|---|---|
| $(x_{11}-1)c_{11}$ $+x_{11}c_{21}$ $+x_{11}c_{31}$ | $(x_{11}-1)c_{12}$ $+x_{11}c_{22}$ $+x_{11}c_{32}$ | $(x_{11}-1)c_{1p}$ $+x_{11}c_{2p}$ $+x_{11}c_{3p}$ | | | $(x_{11}-1)T_1$ $+x_{11}T_2$ $+x_{11}T_3$ | | | | (e21) |
| $x_{21}c_{11}$ $+(x_{21}-1)c_{21}$ $+x_{21}c_{31}$ | $x_{21}c_{12}$ $+(x_{21}-1)c_{22}$ $+x_{21}c_{32}$ | $x_{21}c_{1p}$ $+(x_{21}-1)c_{2p}$ $+x_{21}c_{3p}$ | | $-\sum_p^{perf}\sum_k^{nc} q_{pk}$ | $x_{21}T_1$ $+(x_{21}-1)T_2$ $+x_{21}T_3$ | | | | (e21) |
| $-c_{11}$ $-c_{21}$ $-c_{31}$ | $-c_{12}$ $-c_{22}$ $-c_{32}$ | $-c_{1p}$ $-c_{2p}$ $-c_{3p}$ | $\frac{h_{11}}{\varepsilon}$ | $\frac{h_{21}}{\varepsilon}$ | $-T_1$ $-T_2$ $-T_3$ $+\frac{1}{\varepsilon}$ | | | $-\frac{1}{\varepsilon}$ | (e27) |
| | | | 1 | 1 | | −1 | −1 | | (e26) |
| | | | $\frac{h_{11}}{\varepsilon}$ | $\frac{h_{21}}{\varepsilon}$ | $\frac{1}{\varepsilon}$ | | | | (e26) |
| | | | | | | $q_{T2}\sum_{n=1}^{np} a_n \left(\frac{\partial Q_n}{\partial q_1}\right)$ $/\sum_{n=1}^{np}\sum_{k=1}^{nc} a_n \frac{\partial Q_n}{\partial q_k} x_k$ $-\frac{\partial Q_n}{\partial q_{nc}}$ | $q_{T2}\sum_{n=1}^{np} a_n \left(\frac{\partial Q_n}{\partial q_2}\right)$ $/\sum_{n=1}^{np}\sum_{k=1}^{nc} a_n \frac{\partial Q_n}{\partial q_k} x_k$ $-\frac{\partial Q_n}{\partial q_{nc}}$ | $\frac{1}{\varepsilon}$ | (e27) |

| $\frac{\partial R}{\partial m_1}$ | $\frac{\partial R}{\partial m_2}$ | $\frac{\partial R}{\partial P}$ | $\frac{\partial R}{\partial x_{11}}$ | $\frac{\partial R}{\partial x_{21}}$ | $\frac{\partial R}{\partial P_1}$ | $\frac{\partial R}{\partial x_{12}}$ | $\frac{\partial R}{\partial x_{22}}$ | $\frac{\partial R}{\partial P_2}$ | Eq. |
|---|---|---|---|---|---|---|---|---|---|
| $(x_{11}-1)c_{11}$ $+x_{11}c_{21}$ $+x_{11}c_{31}$ | $(x_{11}-1)c_{12}$ $+x_{11}c_{22}$ $+x_{11}c_{32}$ | $(x_{11}-1)c_{1p}$ $+x_{11}c_{2p}$ $+x_{11}c_{3p}$ | $-\sum_{p}^{perf}\sum_{k}^{nc}q_{pk}$ | | $(x_{11}-1)T_1$ $+x_{11}T_2$ $+x_{11}T_3$ | | | | (e21) |
| $x_{21}c_{11}$ $+(x_{21}-1)c_{21}$ $+x_{21}c_{31}$ | $x_{21}c_{12}$ $+(x_{21}-1)c_{22}$ $+x_{21}c_{32}$ | $x_{21}c_{1p}$ $+(x_{21}-1)c_{2p}$ $+x_{21}c_{3p}$ | | $-\sum_{p}^{perf}\sum_{k}^{nc}q_{pk}$ | $x_{21}T_1$ $+(x_{21}-1)T_2$ $+x_{21}T_3$ | | | | (e21) |
| $-c_{11}$ $-c_{21}$ $-c_{31}$ | $-c_{12}$ $-c_{22}$ $-c_{32}$ | $-c_{1p}$ $-c_{2p}$ $-c_{3p}$ | $\frac{h_{11}}{\varepsilon}$ | $\frac{h_{21}}{\varepsilon}$ | $-T_1$ $-T_2$ $-T_3$ $+\frac{1}{\varepsilon}$ | | | $-\frac{1}{\varepsilon}$ | (e27) |
| $(x_{11}-1)c_{11}$ $+x_{11}c_{21}$ $+x_{11}c_{31}$ | $(x_{11}-1)c_{12}$ $+x_{11}c_{22}$ $+x_{11}c_{32}$ | $(x_{11}-1)c_{1p}$ $+x_{11}c_{2p}$ $+x_{11}c_{3p}$ | | | $(x_{11}-1)T_1$ $+x_{11}T_2$ $+x_{11}T_3$ | $-\sum_{p}^{perf}\sum_{k}^{nc}q_{pk}$ | | | (e26) |
| $x_{21}c_{11}$ $+(x_{21}-1)c_{21}$ $+x_{21}c_{31}$ | $x_{21}c_{12}$ $+(x_{21}-1)c_{22}$ $+x_{21}c_{32}$ | $x_{21}c_{1p}$ $+(x_{21}-1)c_{2p}$ $+x_{21}c_{3p}$ | | | $x_{21}T_1$ $+(x_{21}-1)T_2$ $+x_{21}T_3$ | | $-\sum_{p}^{perf}\sum_{k}^{nc}q_{pk}$ | | (e26) |
| $-c_{11}$ $-c_{21}$ $-c_{31}$ | $-c_{12}$ $-c_{22}$ $-c_{32}$ | $-c_{1p}$ $-c_{2p}$ $-c_{3p}$ | | | $-T_1$ $-T_2$ $-T_3$ | $q_{T2}\sum_{n=1}^{np}a_n\left(\frac{\partial Q_n}{\partial q_1}\right)$ $-\sum_{n=1}^{np}\sum_{k=1}^{nc}\frac{\partial Q_n}{\partial q_{n_c}}a_n\frac{\partial Q_n}{\partial q_{k}}x_k$ | $q_{T2}\sum_{n=1}^{np}a_n\left(\frac{\partial Q_n}{\partial q_2}\right)$ $-\sum_{n=1}^{np}\sum_{k=1}^{nc}\frac{\partial Q_n}{\partial q_{n_c}}a_n\frac{\partial Q_n}{\partial q_{k}}x_k$ | | (e27) |

Figure 9 Jacobian at network side after adding equations of perforation node to equations of reference node (the bottom-hole node)

| $\frac{\partial R}{\partial m_1}$ | $\frac{\partial R}{\partial m_2}$ | $\frac{\partial R}{\partial P}$ | $\frac{\partial R}{\partial x_{11}}$ | $\frac{\partial R}{\partial x_{21}}$ | $\frac{\partial R}{\partial P_1}$ | $\frac{\partial R}{\partial x_{12}}$ | $\frac{\partial R}{\partial x_{22}}$ | $\frac{\partial R}{\partial P_2}$ | Eq. |
|---|---|---|---|---|---|---|---|---|---|
| $(x_{11}-1)c_{11}$ $+x_{11}c_{21}$ $+x_{11}c_{31}$ | $(x_{11}-1)c_{12}$ $+x_{11}c_{22}$ $+x_{11}c_{32}$ | $(x_{11}-1)c_{1p}$ $+x_{11}c_{2p}$ $+x_{11}c_{3p}$ | $-\sum_{p}^{perf}\sum_{k}^{nc} q_{pk}$ | | $(x_{11}-1)T_1$ $+x_{11}T_2$ $+x_{11}T_3$ | | | | (e21) |
| $x_{21}c_{11}$ $+(x_{21}-1)c_{21}$ $+x_{21}c_{31}$ | $x_{21}c_{12}$ $+(x_{21}-1)c_{22}$ $+x_{21}c_{32}$ | $x_{21}c_{1p}$ $+(x_{21}-1)c_{2p}$ $+x_{21}c_{3p}$ | | $-\sum_{p}^{perf}\sum_{k}^{nc} q_{pk}$ | $x_{21}T_1$ $+(x_{21}-1)T_2$ $+x_{21}T_3$ | | | | (e21) |
| $-c_{11}-c_{21}$ $-c_{31}$ | $-c_{12}-c_{22}$ $-c_{32}$ | $-c_{1p}-c_{2p}$ $-c_{3p}$ | $\frac{h_{11}}{\varepsilon}$ | $\frac{h_{21}}{\varepsilon}$ | $-T_1-T_2$ $-T_3+\frac{1}{\varepsilon}$ | | | | (e27) |
| $(x_{11}-1)c_{11}$ $+x_{11}c_{21}$ $+x_{11}c_{31}$ | $(x_{11}-1)c_{12}$ $+x_{11}c_{22}$ $+x_{11}c_{32}$ | $(x_{11}-1)c_{1p}$ $+x_{11}c_{2p}$ $+x_{11}c_{3p}$ | | | $(x_{11}-1)T_1$ $+x_{11}T_2$ $+x_{11}T_3$ | $-\sum_{p}^{perf}\sum_{k}^{nc} q_{pk}$ | | | (e26) |
| $x_{21}c_{11}$ $+(x_{21}-1)c_{21}$ $+x_{21}c_{31}$ | $x_{21}c_{12}$ $+(x_{21}-1)c_{22}$ $+x_{21}c_{32}$ | $x_{21}c_{1p}$ $+(x_{21}-1)c_{2p}$ $+x_{21}c_{3p}$ | | | $x_{21}T_1$ $+(x_{21}-1)T_2$ $+x_{21}T_3$ | | $-\sum_{p}^{perf}\sum_{k}^{nc} q_{pk}$ | | (e26) |
| $-c_{11}-c_{21}$ $-c_{31}$ $-\omega_1[(x_{11}-1)c_{11}$ $+x_{11}c_{21}$ $+x_{11}c_{31}]$ $-\omega_2[x_{21}c_{11}$ $+(x_{21}-1)c_{21}$ $+x_{21}c_{31}]$ | $-c_{12}-c_{22}$ $-c_{32}$ $-\omega_1[(x_{11}-1)c_{12}$ $+x_{11}c_{22}$ $+x_{11}c_{32}]$ $-\omega_2[x_{21}c_{12}$ $+(x_{21}-1)c_{22}$ $+x_{21}c_{32}]$ | $-c_{1p}-c_{2p}$ $-c_{3p}$ $-\omega_1[(x_{11}-1)c_{1p}$ $+x_{11}c_{2p}$ $+x_{11}c_{3p}]$ $-\omega_2[x_{21}c_{1p}$ $+(x_{21}-1)c_{2p}$ $+x_{21}c_{3p}]$ | | | $-T_1-T_2$ $-T_3$ $-\omega_1[(x_{11}-1)T_1$ $+x_{11}T_2$ $+x_{11}T_3]$ $-\omega_2[x_{21}T_1$ $+(x_{21}-1)T_2$ $+x_{21}T_3]$ | | | $-\frac{1}{\varepsilon}$ | (e27) |

Figure 10: Jacobian at network side after elimination of composition in total mass balance equation of the reference node

Figure 11: Jacobian matrix at network side for a gridded well model with rate constraint

| $\frac{\partial R}{\partial m_{11}}$ | $\frac{\partial R}{\partial m_{21}}$ | $\frac{\partial R}{\partial P_1}$ | $\frac{\partial R}{\partial m_{12}}$ | $\frac{\partial R}{\partial m_{22}}$ | $\frac{\partial R}{\partial P_2}$ | $\frac{\partial R}{\partial m_{13}}$ | $\frac{\partial R}{\partial m_{23}}$ | $\frac{\partial R}{\partial P_3}$ | $\frac{\partial R}{\partial x_{11}}$ | $\frac{\partial R}{\partial x_{21}}$ | $\frac{\partial R}{\partial P_1}$ | $\frac{\partial R}{\partial x_{12}}$ | $\frac{\partial R}{\partial x_{22}}$ | $\frac{\partial R}{\partial P_2}$ | $\frac{\partial R}{\partial x_{13}}$ | $\frac{\partial R}{\partial x_{23}}$ | $\frac{\partial R}{\partial P_3}$ | $\frac{\partial R}{\partial x_{14}}$ | $\frac{\partial R}{\partial x_{24}}$ | $\frac{\partial R}{\partial P_4}$ |
|---|---|---|---|---|---|---|---|---|---|---|---|---|---|---|---|---|---|---|---|---|
| $c_{11}^1$ | $c_{12}^1$ | $c_{1p}^1$ | | | | | | | | | | | | | | | | | | |
| $c_{21}^1$ | $c_{22}^1$ | $c_{2p}^1$ | | | | | | | | | | | | | | | | | | |
| $c_1^1$ | $c_2^1$ | $c_p^1$ | | | | | | | | | | | | | | | | | | |
| | | | $c_{11}^2$ | $c_{12}^2$ | $c_{1p}^2$ | | | | | | | | | | | | | | | |
| | | | $c_{21}^2$ | $c_{22}^2$ | $c_{2p}^2$ | | | | | | | | | | | | | | | |
| | | | $c_1^2$ | $c_2^2$ | $c_p^2$ | | | | | | | | | | | | | | | |
| | | | | | | $c_{11}^3$ | $c_{12}^3$ | $c_{1p}^3$ | | | | | | | | | | | | |
| | | | | | | $c_{21}^3$ | $c_{22}^3$ | $c_{2p}^3$ | | | | | | | | | | | | |
| | | | | | | $c_1^3$ | $c_2^3$ | $c_p^3$ | | | | | | | | | | | | |
| | | | | | | | | | $-q_{pT1}$ | $-q_{pT1}$ | $\widetilde{T}_{11}$ | | | | | | | | | |
| | | | | | | | | | $\frac{h_{11}}{\varepsilon_1}$ | $\frac{h_{21}}{\varepsilon_1}$ | $\widetilde{T}_{21}$ | | | | | | | | | |
| | | | | | | | | | $-\frac{h_{11}\Delta x_{12}}{\varepsilon_1}$ | $-\frac{h_{21}\Delta x_{12}}{\varepsilon_1}$ | $\widetilde{T}_1+\frac{1}{\varepsilon_1}$ | | | | | | | | | |
| | | | | | | | | | $q_{T1}-\frac{h_{11}\Delta x_{12}}{\varepsilon_1}$ | $q_{T1}-\frac{h_{21}\Delta x_{12}}{\varepsilon_1}$ | $-\frac{1}{\varepsilon_1}\Delta x_{12}$ | $-q_{rT2}$ | $-q_{rT2}$ | $-\frac{1}{\varepsilon_1}$ | | | | | | |
| | | | | | | | | | $-\frac{h_{11}\Delta x_{12}}{\varepsilon_1}$ | $-\frac{h_{21}\Delta x_{12}}{\varepsilon_1}$ | $-\frac{1}{\varepsilon_1}\Delta x_{12}$ | $h_{12}$ | $h_{22}$ | $\widetilde{T}_{12}$ | | | | | | |
| | | | | | | | | | $\frac{h_{11}}{\varepsilon_1}$ | $\frac{h_{21}}{\varepsilon_1}$ | $-\frac{1}{\varepsilon_1}$ | $\frac{h_{12}}{\varepsilon_2}$ | $\frac{h_{22}}{\varepsilon_2}$ | $\frac{1}{\varepsilon_1}+\frac{1}{\varepsilon_2}\Delta x_{12}$ | | | | | | |
| | | | | | | | | | | | | $q_{T2}-\frac{h_{12}\Delta x_{23}}{\varepsilon_2}$ | $q_{T2}-\frac{h_{22}\Delta x_{23}}{\varepsilon_2}$ | $\widetilde{T}_2+\frac{1}{\varepsilon_2}$ | $-q_{T2}$ | $-q_{pT3}$ | $\frac{1}{\varepsilon_2}$ | | | |
| | | | | | | | | | | | | $-\frac{h_{12}\Delta x_{23}}{\varepsilon_2}$ | $-\frac{h_{22}\Delta x_{23}}{\varepsilon_2}$ | $-\frac{1}{\varepsilon_2}\Delta x_{23}$ | $\frac{h_{13}}{\varepsilon_3}$ | $\frac{h_{23}}{\varepsilon_3}$ | $\frac{\widetilde{T}_{13}}{1+\frac{1}{\varepsilon_2}\Delta x_{23}}$ | | | |
| | | | | | | | | | | | | $\frac{h_{12}}{\varepsilon_2}$ | $\frac{h_{22}}{\varepsilon_2}$ | $-\frac{1}{\varepsilon_2}\Delta x_{23}$ | | | $\frac{T_{23}}{1+\frac{1}{\varepsilon_2}\Delta x_{23}}$ | | | |
| | | | | | | | | | | | | | | | | | $\widetilde{T}_3+\frac{1}{\varepsilon_2}+\frac{1}{\varepsilon_3}$ | | | $-\frac{1}{\varepsilon_3}$ |
| | | | | | | | | | | | | | | | 1 | | | | | |
| | | | | | | | | | | | | | | | $-\frac{h_{13}}{\varepsilon_3}$ | $-\frac{h_{23}}{\varepsilon_3}$ | $\frac{1}{\varepsilon_3}$ | | | |
| | | | | | | | | | | | | | | | | | | $-1$ | $-1$ | |
| | | | | | | | | | | | | | | | | | | $\widetilde{\omega}_1$ | $\widetilde{\omega}_2$ | $\frac{1}{\varepsilon_3}$ |

| $\frac{\partial R}{\partial m_{11}}$ | $\frac{\partial R}{\partial m_{21}}$ | $\frac{\partial R}{\partial P_1}$ | $\frac{\partial R}{\partial m_{12}}$ | $\frac{\partial R}{\partial m_{22}}$ | $\frac{\partial R}{\partial P_2}$ | $\frac{\partial R}{\partial m_{13}}$ | $\frac{\partial R}{\partial m_{23}}$ | $\frac{\partial R}{\partial P_3}$ | $\frac{\partial R}{\partial x_{11}}$ | $\frac{\partial R}{\partial x_{21}}$ | $\frac{\partial R}{\partial x_{12}}$ | $\frac{\partial R}{\partial x_{22}}$ | $\frac{\partial R}{\partial P_1}$ | $\frac{\partial R}{\partial P_2}$ | $\frac{\partial R}{\partial x_{13}}$ | $\frac{\partial R}{\partial x_{23}}$ | $\frac{\partial R}{\partial P_3}$ | $\frac{\partial R}{\partial x_{14}}$ | $\frac{\partial R}{\partial x_{24}}$ | $\frac{\partial R}{\partial P_4}$ |
|---|---|---|---|---|---|---|---|---|---|---|---|---|---|---|---|---|---|---|---|---|
| $c_{11}^1$ | $c_{12}^1$ | $c_{1p}^1$ | $c_{11}^2$ | $c_{12}^2$ | $c_{1p}^2$ | $c_{11}^3$ | $c_{12}^3$ | $c_{1p}^3$ | $\frac{h_{11}\Delta x_{12}}{\varepsilon_1}$ | $\frac{h_{21}\Delta x_{12}}{\varepsilon_1}$ | $-\frac{h_{12}\Delta x_{23}}{\varepsilon_2}$ | $-\frac{h_{22}\Delta x_{23}}{\varepsilon_2}$ | $\widetilde{T}_{11}$ | $\widetilde{T}_{12}$ | | | $\widetilde{T}_{13}$ | $-q_{T3}$ | | |
| $c_{21}^1$ | $c_{22}^1$ | $c_{2p}^1$ | $c_{21}^2$ | $c_{22}^2$ | $c_{2p}^2$ | $c_{21}^3$ | $c_{22}^3$ | $c_{2p}^3$ | $\frac{h_{11}\Delta x_{12}}{\varepsilon_1}$ | $\frac{h_{21}\Delta x_{12}}{\varepsilon_1}$ | $-\frac{h_{12}\Delta x_{23}}{\varepsilon_2}$ | $-\frac{h_{22}\Delta x_{23}}{\varepsilon_2}$ | $\widetilde{T}_{21}$ | $\widetilde{T}_{22}$ | | | $\widetilde{T}_{23}$ | | $-q_{T3}$ | |
| $c_1^1$ | $c_2^1$ | $c_p^1$ | $c_1^2$ | $c_2^2$ | $c_p^2$ | $c_1^3$ | $c_2^3$ | $c_p^3$ | | | | | $\widetilde{T}_1$ | $\widetilde{T}_2$ | | | $\widetilde{T}_3$ | $\widetilde{\omega}_1$ | $\widetilde{\omega}_2$ | |

Figure 12: Coefficient matrix at the reference node after all coefficients have been lumped to the reference node

| $\frac{\partial R}{\partial m_{11}}$ | $\frac{\partial R}{\partial m_{21}}$ | $\frac{\partial R}{\partial P_1}$ | $\frac{\partial R}{\partial m_{12}}$ | $\frac{\partial R}{\partial m_{22}}$ | $\frac{\partial R}{\partial P_2}$ | $\frac{\partial R}{\partial m_{13}}$ | $\frac{\partial R}{\partial m_{23}}$ | $\frac{\partial R}{\partial P_3}$ | $\frac{\partial R}{\partial x_{14}}$ | $\frac{\partial R}{\partial x_{24}}$ | $\frac{\partial R}{\partial P_4}$ |
|---|---|---|---|---|---|---|---|---|---|---|---|
| $c_{11}^1$ | $c_{12}^1$ | $c_{1p}^1$ | $c_{11}^2$ | $c_{12}^2$ | $c_{1p}^2$ | $c_{11}^3$ | $c_{12}^3$ | $c_{1p}^3$ | | | $\widetilde{T}_{11}+\widetilde{T}_{12}+\widetilde{T}_{13}$ |
| $c_{21}^1$ | $c_{22}^1$ | $c_{2p}^1$ | $c_{21}^2$ | $c_{22}^2$ | $c_{2p}^2$ | $c_{21}^3$ | $c_{22}^3$ | $c_{2p}^3$ | | | $\widetilde{T}_{21}+\widetilde{T}_{22}+\widetilde{T}_{23}$ |
| $c_1^1$ | $c_2^1$ | $c_p^1$ | $c_1^2$ | $c_2^2$ | $c_p^2$ | $c_1^3$ | $c_2^3$ | $c_p^3$ | $-q_{T3}$ | $\widetilde{\omega}_2$ | $\widetilde{T}_1+\widetilde{T}_2+\widetilde{T}_3$ |

Figure 13: Coefficient matrix at the reference node after hydraulics derivatives with respect to compositions are dropped.

| $\frac{\partial R}{\partial m_{11}}$ | $\frac{\partial R}{\partial m_{21}}$ | $\frac{\partial R}{\partial P_1}$ | $\frac{\partial R}{\partial m_{12}}$ | $\frac{\partial R}{\partial m_{22}}$ | $\frac{\partial R}{\partial P_2}$ | $\frac{\partial R}{\partial m_{13}}$ | $\frac{\partial R}{\partial m_{23}}$ | $\frac{\partial R}{\partial P_3}$ | $\frac{\partial R}{\partial x_{14}}$ | $\frac{\partial R}{\partial x_{24}}$ | $\frac{\partial R}{\partial P_4}$ |
|---|---|---|---|---|---|---|---|---|---|---|---|
| $c_{11}^1$ | $c_{12}^1$ | $c_p^1$ | $c_{11}^2$ | $c_{12}^2$ | $c_p^2$ | $c_{11}^3$ | $c_{12}^3$ | $c_p^3$ | | | $\widetilde{T}_{11}+\widetilde{T}_{12}+\widetilde{T}_{13}$ |
| $c_{21}^1$ | $c_{22}^1$ | $c_p^1$ | $c_{21}^2$ | $c_{22}^2$ | $c_p^2$ | $c_{21}^3$ | $c_{22}^3$ | $c_p^3$ | | | $\widetilde{T}_{21}+\widetilde{T}_{22}+\widetilde{T}_{23}$ |
| $c_1^1$ | $c_2^1$ | $c_p^1$ | $c_1^2$ | $c_2^2$ | $c_p^2$ | $c_1^3$ | $c_2^3$ | $c_p^3$ | $-q_{T3}$ | | $\widetilde{T}_1+\widetilde{T}_2+\widetilde{T}_3$ |
| $-\omega_1 c_{11}^1$ | $-\omega_1 c_{12}^1$ | $-\omega_1 c_p^1$ | $-\omega_1 c_{11}^2$ | $-\omega_1 c_{12}^2$ | $-\omega_1 c_p^2$ | $-\omega_1 c_{11}^3$ | $-\omega_1 c_{12}^3$ | $-\omega_1 c_p^3$ | | | $-\omega_1(\widetilde{T}_{11}+\widetilde{T}_{12}+\widetilde{T}_{13})$ |
| $-\omega_2 c_{21}^1$ | $-\omega_2 c_{22}^1$ | $-\omega_2 c_p^1$ | $-\omega_2 c_{21}^2$ | $-\omega_2 c_{22}^2$ | $-\omega_2 c_p^2$ | $-\omega_2 c_{21}^3$ | $-\omega_2 c_{22}^3$ | $-\omega_2 c_p^3$ | | | $-\omega_2(\widetilde{T}_{21}+\widetilde{T}_{22}+\widetilde{T}_{23})$ |

Figure 14: Coefficient matrix at the reference node after the elimination of composition coupling terms at the reference node

Figure 15: The global matrix structure for implicit formulation with implicit wells and surface network

Figure 16: The global matrix structure without surface network after elimination of mass coupling terms in the producing perforation connections.

Figure 17: The pressure matrix structure

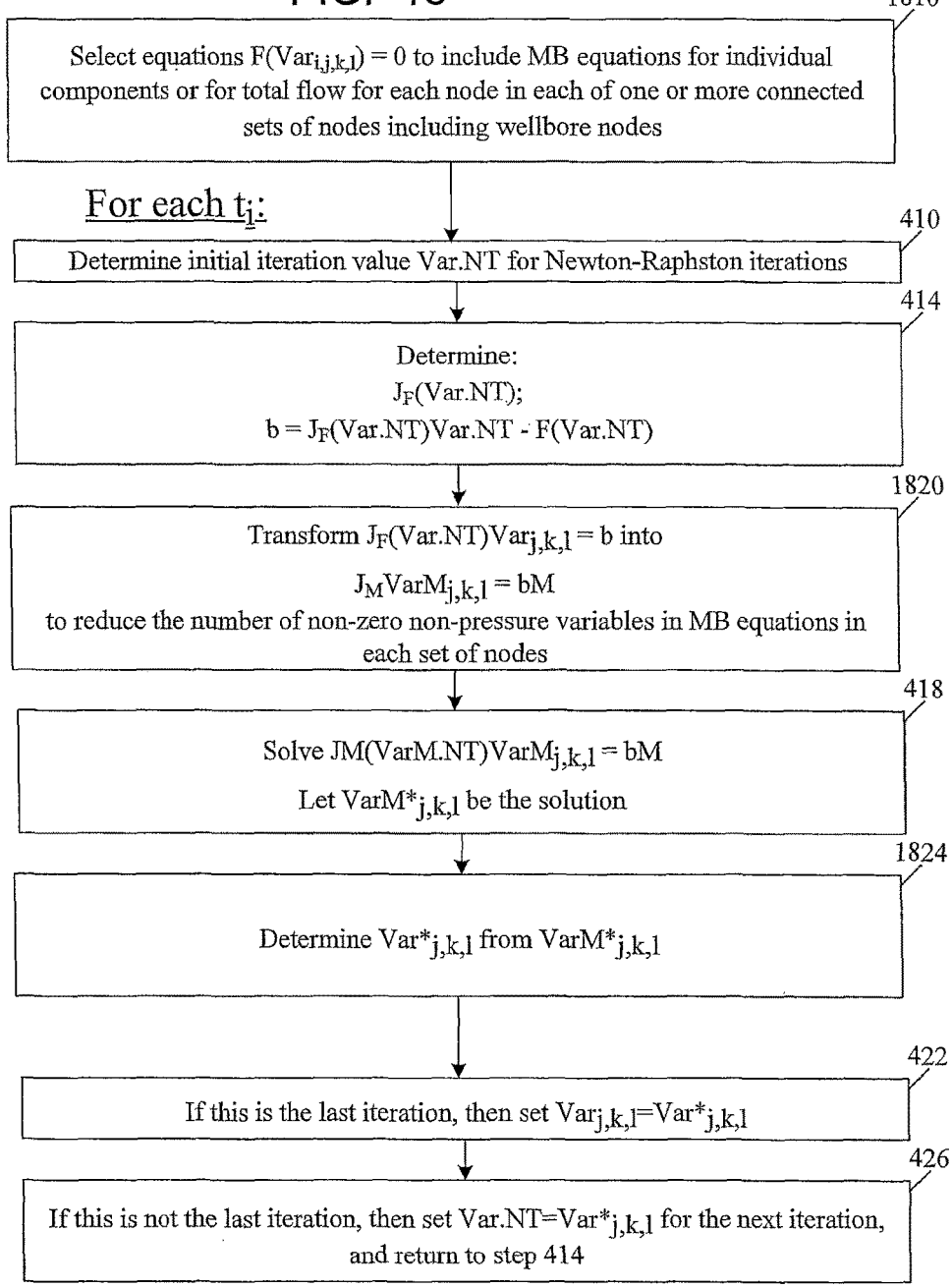

OIL OR GAS PRODUCTION USING COMPUTER SIMULATION OF OIL OR GAS FIELDS AND PRODUCTION FACILITIES

The present application is a U.S. National Stage patent application of International Patent Application No. PCT/US2012/040023, filed on May 30, 2012, the benefit of which is claimed and the disclosure of which is incorporated herein by reference in its entirety.

BACKGROUND OF THE INVENTION

The present invention relates to oil and gas production using computerized simulation of oil or gas reservoirs and of production facilities.

FIG. 1 schematically illustrates production facilities for extracting oil and/or gas from a reservoir 110. Reservoir 110 consists of subsurface rock formations below the earth surface 112. A wellbore 120.1 has been drilled into the reservoir and connected to surface facilities 130 a system of pipes and pumps 130 to pump the fluid (oil or gas, possibly mixed with water or mud) out of the reservoir. A casing has been inserted into wellbore 120.1, and perforations 134 were made in the casing to allow the wellbore to communicate with the reservoir. Another wellbore 120.2, connected to surface network 130 and having perforations 134, can optionally be used to inject water, steam, carbon dioxide or other chemicals into the reservoir to push the oil or gas towards wellbore 120.1 or make sticky oil more mobile.

Design of production facilities involves choice of wellbore locations and injected chemicals, well shapes and dimensions, pipe and pump networks, drilling schedules, production schedules, etc. The optimal choices of these and other parameters depend on physical properties of reservoir 110 such as pressures, saturations, porosities, and possibly others. Such choices are facilitated by computer simulation that simulates production for existing or hypothetical production facilities and production schedules. A suitable computer system 204 (FIG. 2) includes one or more computer processors 210 coupled to a memory 220. Typically, test measurements are made at selected locations in reservoir 110 or in existing production facilities to determine parameters of interest. The test data may include geological data from sources such as seismic analysis, rock cores, and well logs. These data may include data on rock porosities, permeabilities, and other information of interest, and allow determination of parameters of interest such as pressures or saturations at a number of locations. The test measurements are stored in memory 220 as shown at 230. A simulator program 240, stored in memory 220, is executed by processors 210 to read the test data 230 and provide simulated results which can be stored in memory 220 and/or displayed on a printer or computer monitor or other output device, or provided to another computer program or another computer over a network or otherwise, for use by oil field designers or other personnel.

A discrete model of reservoir 110 and the production facilities is created by computer 204 in memory 220 for use by simulation program 240 as illustrated in FIG. 3. More particularly, an imaginary grid of cells (grid blocks) 320 is superimposed on reservoir 110, with data indicating the locations of wellbores 120 and perforations 134. A node (not shown) is defined in each cell (typically, but not necessarily, at the center), and the pressure and possibly other values in the cell will be modeled as the pressure or other values at the node. The wellbore portions above the perforations are shown as 120.1W, 120.2W and will be called just "wells" herein. Nodes 324 are defined along each well 120W (i.e. 120.1W or 120.2W) in the computer model; these nodes represent point locations at which the pressures or other values will modeled. A well may have one or more nodes 324. Connections 330 represent the well portions between the nodes 324. Similar nodes and connections (not shown) can represent the surface network 130. Other nodes 325 may be defined to represent point locations in the perforated sections of the wellbores (below the wells). Connections 331 represent the wellbore portions between the nodes 325 and between the top wellbore node 325 and the first well node 324 (the "bottom-hole" node). A flow of material between a perforated cell 320 (i.e. a cell perforated by a wellbore) and the wellbore will be modeled as the flow between the perforated cell and a node 325, or a flow between the cell and the corresponding bottom-hole node 324.

A coordinate system (XYZ) is chosen to represent various locations. A time axis 304 with time points t1, t2, t3 . . . is defined in computer 204.

A set of equations is chosen to model the oil or gas field, including hydraulics equations between nodes in the wells, wellbores, and the surface network; Darcy and non-Darcy flow between cells 320; perforation equations between cells 320 and nodes 325; fluid component mass balance equations for nodes and cells; constraint equations, and possibly others. See U.S. Pat. No. 7,668,707 issued Feb. 23, 2010 to Watts, III et al., incorporated herein by reference. The equations may include differential equations, and the differential equations are discretized using known techniques. The equations can be symbolically written as:

$$F(\text{Var}_{i,j,k,l})=0 \quad (1)$$

where $\text{Var}_{i,j,k,l}$ represents pressures, flow rates, or other variables at the nodes and connections at different times. The subscript "i" represents the time point $t_i$ on axis 304, and the subscripts j, k, l represent X, Y, and Z values respectively. The values $\text{Var}_{i,j,k,l}$ are treated as independent variables.

Since some physical parameters can be expressed through others, there is some latitude as to which parameters are chosen as the independent variables (primary variables) in equations (1). Further, the equations (1) depend on the discretization method, and in particular on whether any particular Var value is measured at a cell 320 or a node 324 or 325, or a segment 330 or 331. Such choices will affect how efficiently the computer can solve the equations. The term "efficiently" relates to minimal use of the computer resources, and particularly the processor and memory. It is desirable to reduce the execution time and memory amount needed to solve the equations while providing a solution that serves as a good approximation to the real world.

There can be millions of different locations and time points, so the equation (1) may represent millions or billions of scalar equations. In a typical procedure, the equations (1) are solved for each of consecutive times $t_i$, i.e. for time $t_1$, then for time $t_2$, and so on. The solution for time $t_1$ depends on the test measurements stored as shown at 230 in FIG. 2. The solution for each subsequent time $t_i$ is found using the previously determined Var values for time $t_{i-1}$ and possibly earlier times and possibly using the test measurements 230.

Equations (1) are typically non-linear, and for each time $t_i$ these equations can be solved approximately using the Newton-Raphson method illustrated in FIG. 4. This is an iterative method in which the non-linear equations (1) are replaced by linear equations at each iteration. The successive iterations use different linear equations to provide hopefully better and better approximate solutions at each iteration. To simplify the notation, let us re-write the equations (1) as:

$$F(x)=0$$

Suppose $x_n$ is a current iterative solution in the Newton-Raphson method. Then the next iteration $x_{n+1}$ is obtained as follows. The Jacobian matrix $J_F(x_n)$ is calculated; this is the matrix of partial derivatives of F(x) evaluated at the current iteration $x_n$. Then the following linear equation is solved for $x_{n+1}$:

$$J_F(x_n)(x_{n+1}-x_n)=-F(x_n)$$

This equation can be alternatively written as:

$$J_F(x_n)(x_{n+1})=J_F(x_n)(x_n)-F(x_n) \quad (2)$$

or $$F'_L(x_{n+1})=b \quad (3)$$

where $F'_L=J_F$, and b is the constant equal to the right-hand side of equation (3).

This process is illustrated in FIG. 4. The symbol Var.NT denotes the current approximation $x_n$. Since $t_i$ is fixed, the $Var_{i,j,k,l}$ will sometimes be written as simply $Var_{j,k,l}$. The values Var.NT of the last iteration are taken as the approximate solution $Var_{i,j,k,l}$ of the equations (1) for the time $t_i$.

The initial iterated values Var.NT is chosen at step 410, and this can be any desired values, e.g. the values $Var_{i-1,j,k,l}$ found in the previous iteration i−1 if i>1, or to some values obtained from the initial measurements 230 if i=1.

At step 414, the matrix $J_F(Var.NT)$ and the value $$b=J_F(Var.NT)Var.NT-F(Var.NT)$$

are determined for the equations (2)-(3). At step 418, these equations are solved, i.e. the following equation is solved:

$$F'_L(Var_{j,k,l})=b \quad (4)$$

Let us denote the solution as $Var^*_{j,k,l}$. If this is the last iteration, then the solution $Var^*_{j,k,l}$ is taken as the solution of (1), i.e. the method of FIG. 4 terminates for $t_i$. See step 422. If other iterations are desired, then the solution $Var^*_{j,k,l}$ is used as the next value of Var.NT for the next iteration (step 426), and steps 414-418 are repeated. Any number of iterations can be used to obtain better and better approximations of the solution of (1). The iterations can be terminated when $F(Var^*_{j,k,l})$ is close to zero in some sense.

Equations (4) may include billions of equations with billions of individual variables shown collectively as $Var_{j,k,l}$. Therefore, computer system 240 solves equations (4) approximately. An exemplary approximate method is a Schwarz method illustrated in FIG. 5. For simplicity, the function $F'_L$ will be denoted simply as f, and $Var_{j,k,l}$ as x. Thus, equation (4) can be written as:

$$f(x)=b \quad (4')$$

The function f represents many scalar linear functions, and the variable x represents just as many scalar components. The Schwarz method will be illustrated on the example in which each of x and f has 1000 scalar components, denoted as x1, x2, . . . , x1000 for x, and denoted as f1, f2, . . . , f1000 for f.

At step 610, the values x1, . . . , x1000 are divided into two overlapping groups of values (more than two groups can also be used). In the example discussed below, the two groups are:

$$G1: x1, \ldots, x600$$

$$G2: x400, \ldots x1000$$

Also, the scalar functions f1, . . . , f1000 are divided into two overlapping groups, with the same number of functions in each group as there are values in G1, G2. For example, the two groups of functions can be:

$$G1': f1, \ldots, f600$$

$$G2': f400, \ldots, f1000$$

We will use the notation G1'(x) to denote the values f1(x) through f600(x); the notation G2'(x) will denote the values f400(x) through f1000(x).

The Schwarz method is an iterative method, and the iterative solution will be denoted as x.sc. The value x.sc output by the Schwarz method is the solution x.

At step 620, the initial iterative value x.sc is determined using any suitable technique. For example, x.sc can be set to the value of Var.NT at step 418 of the current Newton-Raphson iteration of FIG. 4.

At steps 630-640, the next iterated value is determined for x.sc as follows.

At step 630, the x values from G1\G2, i.e. the values x601 through x1000, are set to the corresponding values of the current iterative value x.sc, and the following equation is solved for x1 through x600:

$$G1'(x)=b1 \quad (5)$$

where b1 is the "b" portion corresponding to G1'. In other words, the following equation is solved:

$$G1'(x1, \ldots, x600, x.sc601, \ldots, x.sc1000)=b1 \quad (5')$$

The solution will be denoted x1*, . . . , x600*.

The values x1* through x399* will be used as the corresponding values of the next iterative value of x.sc as explained below.

At step 640, the following equation is solved for x400* through x1000*:

$$G2'(x)=b2 \quad (6)$$

where b2 is the b portion corresponding to G2. In this equation, the values x1, . . . , x399 are constant. In the additive Schwarz method, these values are set to the corresponding values of the current iterative value x.sc. In the multiplicative Schwarz method, these values are set to the corresponding values x1*, . . . , x399* found at step 630. The solution of (6) will be denoted x600*, . . . , x1000*. The values x1* through x1000* will be collectively denoted as x*.

If this is the last iteration, then x* can be taken as the solution of (4'), i.e. as the value $Var^*_{j,k,l}$ at step 418. See step 650. If other iterations are desired (step 660), then the solution x* is used as the next iterated value of x.sc, and steps 630-640 are repeated. Any number of iterations can be used to obtain better and better approximations of the solution of (4').

In some variations of the Schwarz method, iterations other than the first iteration are solved for the residual b−f(x) rather than x. The residual is updated at each iteration. In particular, the overlap values x400*, . . . , x600* found at step 630 are used to update the residual for step 640.

In a variation, the components x400*, . . . , x600* of x* are obtained for step 650 by combining the corresponding values obtained at steps 630 and 640, i.e. by combining the corresponding components of solutions of equations (5) and (6) so as to minimize the residual's norm ‖b−f(x*)‖. A known method for combining these components is GMRES (Generalized Minimum Residual method).

Clearly, the computational complexity of solving the equations (1) depends on the choice of variables Var and the groups G1, G2, G1', G2'. Generally, the reservoirs are quite different from wells with respect to the physics models, so the reservoirs and the wells are usually in different groups. More particularly, each group G1, G2 can be defined through cells 320 or nodes 324 or 325: each group consists of variables pertaining to a group of cells 320 or nodes 324 or 325 or the related segments 330 or 331, and each function group G1', G2' consists of the equations for the corresponding cells and nodes. Thus, the reservoir cells can be placed in group G1 (i.e. in the node group defining G1), the wells in group G2, and the perforation cells 320 (the cells with perforations) and wellbore nodes 325 can be the overlap between G1 and G2. This scheme is used in NEXUS® Reservoir Simulation Software system available from Halliburton of Houston, Tex. In NEXUS®, the variables Var are pressures and component compositions at nodes 324 and 325, and pressures and component masses in the cells 320.

Background information can also be found in the following publications incorporated herein by reference (no representation is being made as to whether or not these publications are prior art relative to the present disclosure):

U.S. patent application publication 2009/0294122 A1 (Dec. 3, 2009), inventors Hansen et al.

U.S. Pat. No. 7,668,707 B2 (Feb. 23, 2010), inventors Watts, III et al.

U.S. Pat. No. 7,516,056 B2 (Apr. 7, 2009), inventors Wallis et al.

U.S. patent application publication 2010/0286971 A1 (Nov. 11, 2010), inventors Middya et al.

UK patent application GB 2 434 235 A (Jul. 18, 2007), applicant Schlumberger Technology Corporation.

European patent application EP 2 192 507 A1 (Jun. 2, 2010), applicant Maersk Olie OG Gas A/S.

PCT application WO 2006/020952 A2 (Feb. 23, 2006), applicants Saudi Arabian Oil Company and ARAMCO Services Company.

H. Kazemi, "Numerical Simulation of Water-Oil Flow in Naturally Fractured Reservoirs", Society of Petroleum Engineers Journal, December 1976, pages 317-326.

Rafael Bru et al., "Overlapping additive and multiplicative Schwarz iterations for H-matrices", Linear Algebra and its Applications, Elsevier, 2003.

SUMMARY

This section summarizes some features of the invention. Other features may be described in the subsequent sections. The invention is defined by the appended claims, which are incorporated into this section by reference.

The inventors have observed that it may be desirable to include the wells 120W in the overlap to obtain a better coupling between the reservoir and the surface network. In some embodiments however, the "perforation" cells 320 (i.e. the cells with perforations 134) are removed from the overlap. Smaller overlap reduces the computational complexity. Other embodiments include the perforation cells in the overlap.

According to another aspect of the invention, the equations for the well and wellbore nodes are processed to eliminate some non-pressure variables. Therefore, when these variables are treated explicitly, the error caused by the explicit treatment is reduced, so the pressure solution is more accurate. In many cases, the accuracy of the pressure solution across the reservoir and surface network determines the performance of the global linear solver for equations (4), i.e. determines the ability to get an accurate solution for all the variables at a minimum computational cost.

The invention is not limited to the features and advantages described above except as defined by the appended claims.

BRIEF DESCRIPTION OF THE DRAWINGS

FIG. 5 is a flow chart of a Schwarz method used to simulate an oil or gas field and production facilities according to prior art.

FIG. 7 is an example of a Jacobian matrix at the wellbore and surface network side before elimination of perforation flow rates and total connection flow rates.

FIG. 8 is an example of a Jacobian matrix at the wellbore and surface network side after elimination of perforation flow rates and total connection flow rates.

FIG. 9 is an example of a Jacobian matrix at the wellbore and surface network side after adding equations for a perforation node (such as 325) to equations at a bottom-hole node serving as a reference node.

FIG. 10 is an example of a Jacobian matrix at the wellbore and surface network side after elimination of compositions in the total mass balance equation for the bottom-hole node serving as a reference node.

FIG. 11 is an example of a Jacobian matrix at the wellbore and surface network side for a gridded well model with a rate constraint.

FIG. 12 is an example of a coefficient matrix at a reference node after the mass balance equations for non-reference nodes have been added to the reference node.

FIG. 13 is an example of a coefficient matrix at a reference node after dropping of hydraulics derivatives with respect to compositions.

FIG. 14 is an example of a coefficient matrix at a reference node after elimination of composition coupling terms at the reference node.

FIG. 15 illustrates an example of a global matrix structure for implicit formulation with implicit wells and surface network.

FIG. 16 illustrates an example of a global matrix structure without the surface network after elimination of mass coupling terms in the producing perforation connections.

FIG. 17 illustrates an example of a pressure matrix structure.

FIGS. 18, 19 are flow charts of simulation methods according to some embodiments of the present invention.

DESCRIPTION OF SOME EMBODIMENTS

Figure 1:
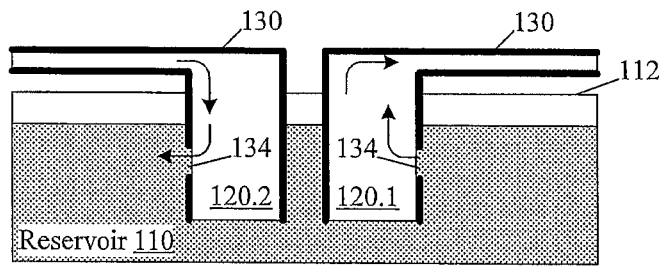
FIG. 1 shows a vertical a cross section of an oil or gas field with production facilities according to prior art.

The embodiments described in this section illustrate but do not limit the invention. The invention is defined by the appended claims.

Some embodiments of the present invention will now be described on the example of the multiplicative Schwarz method as in FIG. 5. The invention includes additive Schwarz however, and can be combined with many existing simulation techniques. Of note, the Schwarz methods are part of a class of methods that can be described as follows:

set some of the variables to constant values, and solve some or all of the equations for the other variables;

then set some or all of those other variables to constant values, and solve for some or all of the variables that were constant in the previous step.

In oil and gas simulation, one type of such methods is IMPES (implicit pressure explicit saturation): to solve the equations (1) for each time $t_i$ given the solution at time $t_{i-1}$ (where $t_0$ means the initial values), the non-pressure variables are set to their $t_{i-1}$ values, and the equations are solved to find the $t_i$ values of the pressures; then the pressures are set to their $t_i$ values, and the equations are solved to find the $t_i$ values of the non-pressure variables. Some of these and other methods are described in the following publications incorporated herein by reference:

Yuanlin Jiang, "Techniques for Modeling Complex Reservoirs and Advanced Wells", Dissertation submitted to the Department of Energy Resources Engineering and the Committee on Graduate Studies of Stanford University, December 2007.

Wing Hong Felix Kwok, "Scalable Linear and Nonlinear Algorithms for Multiphase Flow in Porous Media", Dissertation submitted to the program in scientific computing and computational mathematics and the committee on graduate studies of Stanford University, December 2007.

Denis José Schiozer, "Simultaneous Simulation of Reservoir and Surface Facilities", Dissertation submitted to the Department of Petroleum Engineering and the committee on graduate studies of Stanford University, March 1994.

Eero Vainikko, "Robust Additive Schwarz Methods—Parallel Implementations and Applications", Thesis for the Degree of Doctor Scientiarum, Department of Informatics, university of Bergen, March 1997.

Other such techniques include CPR (Constrained Pressure Residual).

Some embodiments are compatible with AIM (Adaptive Implicit Method), and others described in the documents cited immediately above. Some embodiments are also compatible with FIM (Fully Implicit Method), i.e. when all the variables are treated implicitly (none are replaced by constants) except for the Schwarz method at the stage of FIG. 5. However, as noted above, the invention includes pressure matrix derivations which are not limited to use of the Schwarz method.

Now some multiplicative Schwarz embodiments will be described with just two groups of variables, G1 and G2, for the models illustrated in FIGS. 3 and 6 (described below). In some such embodiments, the group G1 corresponds to the reservoir and perforation cells 320, the wellbore nodes 325 and segments 331 and the well nodes 324 and segments 330 of wells 120W. The group G2 corresponds to all the wells 120W, the wellbores, perforation cells 320 and surface network 130. The overlapping domain is the nodes 324 and segments 330 of wells 120W, the wellbore nodes 325 and segments 331, and the perforation cells 320.

The global linear system (4) is, in matrix form:

$$\begin{bmatrix} A_{rr} & A_{rw} & \\ A_{wr} & A_{ww} & A_{wf} \\ & A_{fw} & A_{ff} \end{bmatrix} \begin{bmatrix} x_r \\ x_w \\ x_f \end{bmatrix} = \begin{bmatrix} b_r \\ b_w \\ b_f \end{bmatrix} \quad (7)$$

Here the subscripts r, w, f denote the reservoir, well, and surface network 130 respectively. For subscript r, the reservoir includes the cells with perforations 134. The vector $[b_r, b_w, b_f]$ on the right hand side (RHS) is the same as b in equation (4). The vector $[x_r, x_w, x_f]$ is the same as $Var_{j,k,l}$.

In the matrix on the left, the rows with $A_{rr}$ correspond to the reservoir portion of equations (4), including the perforation cells 320. The rows with $A_{wr}$ correspond to the well equations, which include equations for flow from each perforated grid block 320 to the corresponding wellbore node 325. The rows with $A_{fw}$ correspond to the facilities equations. The columns with $A_{rr}$ correspond to the reservoir variables (including the perforation grid blocks 320). The columns with $A_{rw}$ correspond to the well variables. The columns with $A_{wf}$ correspond to the facilities variables. The blank entries in the matrix are zeroes.

The G1 group consists of variables $x_r$, $x_w$, and the G1' equations can be written as:

$$\begin{bmatrix} A_{rr} & A_{rw} \\ A_{wr} & A_{ww} \end{bmatrix} \begin{bmatrix} x_r \\ x_w \end{bmatrix} = \begin{bmatrix} b_r \\ b_w \end{bmatrix} \quad (8)$$

These equations are obtained by setting $x_f$ to constant values as described above. The $b_w$ values in (8) are not necessarily the same as in (7).

The G2 group consists of variables $x_w$, $x_f$, and the G2' equations can be written as:

$$\begin{bmatrix} A_{ww} & A_{wf} \\ A_{fw} & A_{ff} \end{bmatrix} \begin{bmatrix} x_w \\ x_f \end{bmatrix} = \begin{bmatrix} b_w \\ b_f \end{bmatrix} \quad (9)$$

The b values in (9) are not necessarily the same as in (7).

System (9) might not exist if the surface network 130 is absent or is not being simulated. If the surface network exists in the simulation system, the system (9) can be solved using known techniques, e.g. a sparse direct solver or ILU (Incomplete Lower/Upper) type iterative solver. We focus on the solution of system (8), which is more complicated in some embodiments.

For FIM, we need to construct the CPR pressure equation on the reservoir. For FIM and IMPES, an approximated pressure matrix for wellbore nodes needs to be constructed since an implicit well modeling is used in both formulations.

Figure 3:
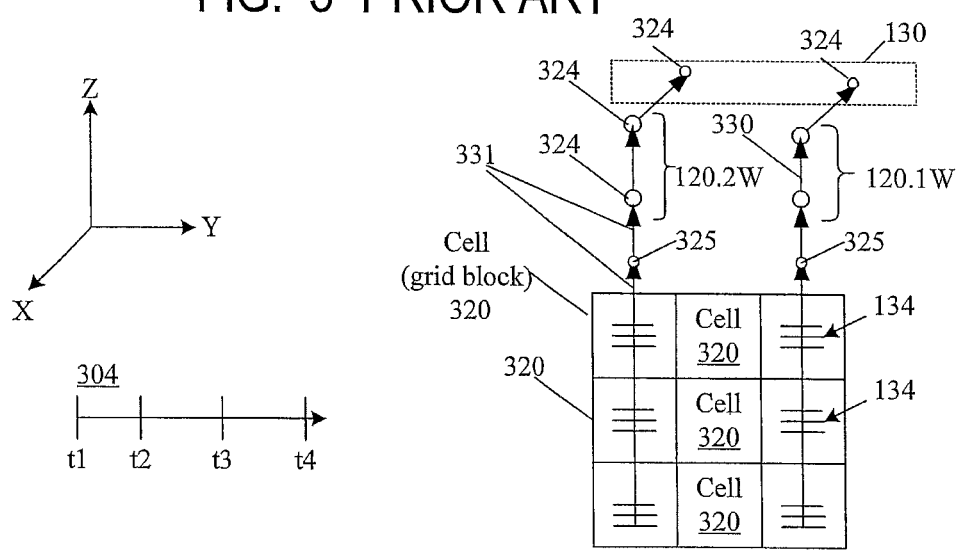
FIG. 3 is a schematic diagram of a model of an oil or gas field and the surface network according to prior art.
Figure 6:
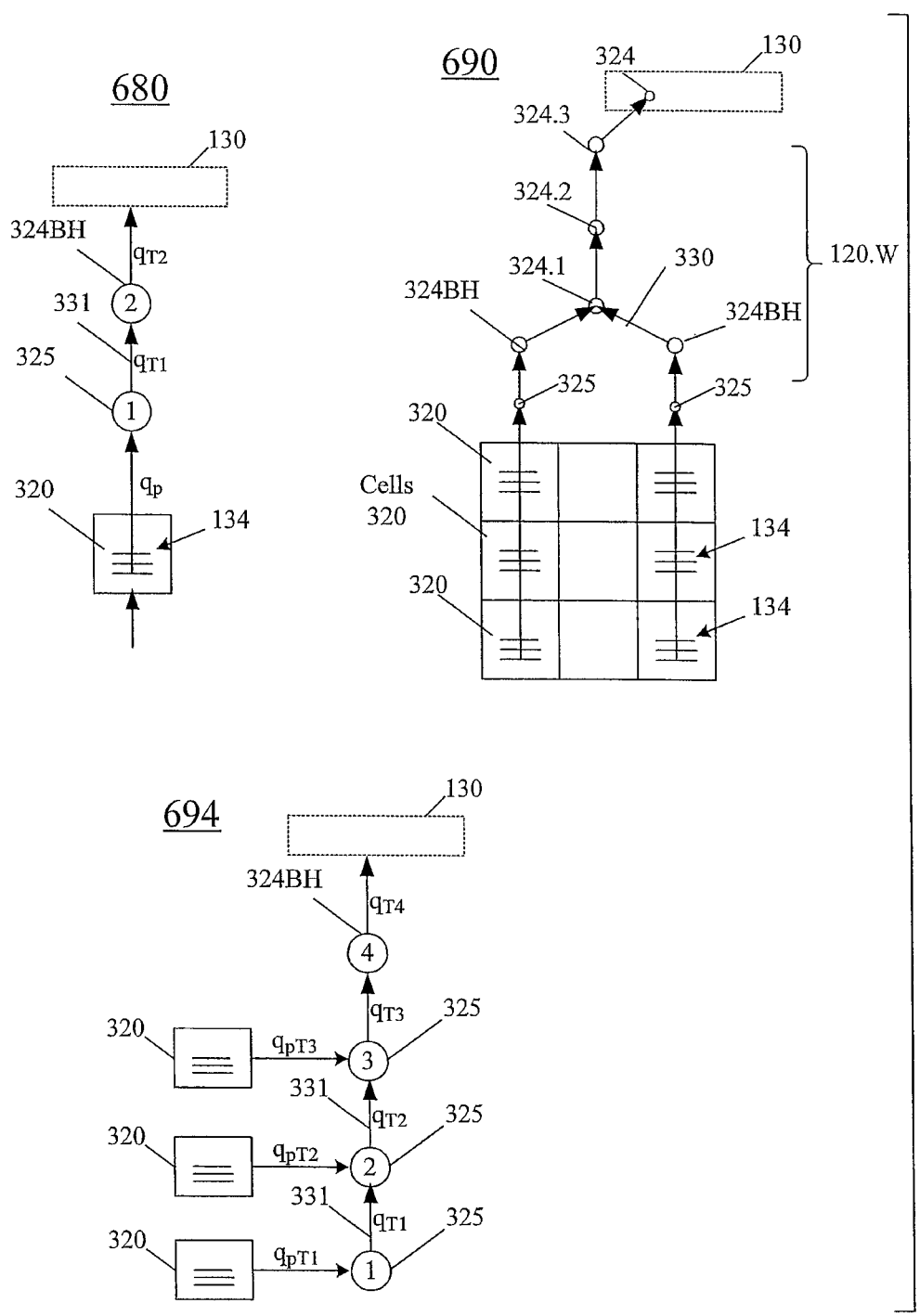
FIG. 6 is a schematic diagram of models of oil or gas fields and the surface networks which models are used to illustrate computer simulation according to some embodiments of the present invention.

FIG. 6 shows exemplary well models 680, 690, 694 which will be used in addition to the model of FIG. 3 to illustrate some embodiments of the present invention. These models are non-limiting examples. All of these models are for production wells (for pumping oil or gas out of the reservoir), but similar techniques apply to injector wells (for injecting water or other substances into the reservoir). The model 680 includes a perforation cell 320 connected to a wellbore node 325 (also called "node 1") by perforation 134, a "bottom hole" node 2 also marked as 324BH (the first node of well 120W downstream of the perforation), and the surface network 130. The "q" variables denote mass transfer rates (mass per time) at various connections 330.

The model 690 includes a multisegment well which splits into two segments at node 324.1. In each segment, the respective bottom-hole node 324BH is connected to the respective wellbore node 325 connected to perforation cells 320. Above the common node 324.1, there are two other nodes 324.2 and 324.3. Node 324.3 is connected to surface network 130. The models of FIGS. 3 and 6 are "lumped well" models, i.e. the flow from the perforation cells in each wellbore is modeled as the flow from these cells into a single node 325.

Model 694 (gridded well model, i.e. with multiple nodes 325) contains three perforation nodes 325, marked as nodes 1, 2, 3 from the bottom. Node 3 is connected to bottom-hole node 4 (marked as 324BH). Each of nodes 1, 2, 3 is connected to a respective perforation cells 320. Node 324BH is connected to surface network 130.

The global matrix for implicit formulation (FIM) for model 694 is shown in FIG. 11. In the following, we will discuss how to approximate the pressure solution at the well side (equations (8)) with a simple lumped well model.

The pressure drop across the connection between an upstream node and the next downstream node (e.g. from node 1 to node 2 in model 680) can be determined by a hydraulics equation as follows:

$$R = P_{up} - P_{dw} - f(q_1, q_2, \ldots q_{nc}, P_{up}, P_{dw}) \tag{e4}$$

Here the subscripts up and dw represent the upstream and downstream nodes (e.g. 1 and 2 in model 680) at a flow connection 330 or 331;

$P_{up}$ and $P_{dw}$ are the pressures at these nodes;

nc is the number of components in the fluid flowing through the connection;

for each component k, the value $q_k$ is the mass flow rate of the component;

f is the function of the hydraulics equation (e.g. based on a pressure drop correlation, tabular input of the pressure drop, Darcy's law or some other model).

We define the composition of component k as $$x_k = \frac{q_k}{q_T} \tag{e5}$$

where $q_T$ is the total mass flow rate through the connection (i.e. the sum of $q_k$). (The x notation for the compositions should not be confused with the x symbol in equations (7), (8) and (9)).

Thus, $$q_k = x_k q_T \tag{e6}$$

where $$q_T = \sum_{k=1}^{nc} q_k \tag{e7}$$

Combining the equations (e6) and (e7) yields $$\sum_{k=1}^{nc} dx_k = 0 \tag{e8}$$

Differentiating equation (e6) gives $$dq_k = q_T dx_k + x_k dq_T \tag{e9}$$

Plugging equations (e8) and (e9) into equation (e4) yields $$dR = \left(1 - \frac{\partial f}{\partial P_{up}}\right) dP_{up} - \left(1 + \frac{\partial f}{\partial P_{dw}}\right) dP_{dw} - \sum_{k=1}^{nc-1} \left(\frac{\partial f}{\partial q_k} - \frac{\partial f}{\partial q_{nc}}\right) q_T dx_k - \sum_{k=1}^{nc} \frac{\partial f}{\partial q_k} x_k dq_T \tag{e10}$$

So the Jacobian derivatives (partial derivatives) with respect to the primary unknowns are $$\frac{\partial R}{\partial P_{up}} = 1 - \frac{\partial f}{\partial P_{up}} \tag{e11}$$

$$\frac{\partial R}{\partial P_{dw}} = -1 - \frac{\partial f}{\partial P_{dw}} \tag{e12}$$

$$\frac{\partial R}{\partial x_k} = -\left(\frac{\partial f}{\partial q_k} - \frac{\partial f}{\partial q_{nc}}\right) q_T \tag{e13}$$

$$\frac{\partial R}{\partial q_T} = -\sum_{k=1}^{nc} \frac{\partial f}{\partial q_k} x_k \tag{e14}$$

Of note, the letter R herein corresponds to F in equations (1). The same symbol R is used for different scalar equations (1).

FIG. 7 is a Jacobian example. The derivatives (e11)-(e14) are shown in the fourth row, marked "(e4)" in the right column (referring to the equations (e4). FIG. 7 assumes that the derivatives $$\frac{\partial f}{\partial q_{up}} \text{ and } \frac{\partial f}{\partial P_{dw}}$$

are zero. This is true if f is treated explicitly (i.e. replaced with a value from the previous iteration), but can be true in case of implicitly treated f. Some derivatives (e13), (e14) are shown as h and ε symbols.

A pressure constraint may be applied to the bottom-hole node:

$$R = P - P_{spec} = 0 \tag{e15}$$

where $P_{spec}$ is a predefined constant. Alternatively, a phase flow rate constraint can be activate at a connection, i.e.:

$$R = \sum_{n=1}^{np} a_n Q_n - Q_{spec} = 0 \tag{e16}$$

Here np is the number of phases (in many applications, there are three phases: gas, oil, and water). For each phase n, $Q_n$ is the corresponding volume flow rate; $a_n$ is the corresponding predefined constant. $Q_{spec}$ is the maximum allowed volume flow rate that can flow in the connection.

Alternatively, the following constraint can be specified:

$$dR = \sum_{n=1}^{np} a_n \sum_{k=1}^{nc} \frac{\partial Q_n}{\partial q_k} dq_k + \sum_{n=1}^{np} a_n \frac{\partial Q_n}{\partial P} dP = 0 \tag{e17}$$

Plugging equations (e8) and (e9) into equation (e17) yields $$dR = \sum_{n=1}^{np} \sum_{k=1}^{nc-1} a_n \left(\frac{\partial Q_n}{\partial q_k} - \frac{\partial Q_n}{\partial nc}\right) q_T dx_k + \sum_{n=1}^{np} \sum_{k=1}^{nc} a_n \frac{\partial Q_n}{\partial q_k} x_k dq_T + \sum_{n=1}^{np} a_n \frac{\partial Q_n}{\partial P} dP = 0 \tag{e18}$$

Usually the rate constraint is specified at surface condition, so the pressure derivative term can be dropped, but it is shown herein for a more general case. The Jacobian derivatives with respect to the primary unknowns are obtained as follows:

$$\frac{\partial R}{\partial x_k} = \sum_{n=1}^{np} a_n \left( \frac{\partial Q_n}{\partial q_k} - \frac{\partial Q_n}{\partial q_{nc}} \right) q_T \tag{e19}$$

$$\frac{\partial R}{\partial q_T} = \sum_{n=1}^{np} \sum_{k=1}^{nc} a_n \frac{\partial Q_n}{\partial q_k} x_k \tag{e20}$$

$$\frac{\partial R}{\partial P} = \sum_{n=1}^{np} a_n \frac{\partial Q_n}{\partial P}$$

The above equations are obtained by considering the flow through a connection 330.

For each node 324 and 325, mass balance equations are used. In particular (see for example nodes 2 and 3 of model 694), for each wellbore node, the total mass flow rate of each component into the node is equal to the sum of the mass flow rates of the same component from each incoming connection and each perforation. Each of these nodes may or may not have perforations, and let perf denote the number of perforations at an exemplary node "r". The node r may have multiple incoming connections. Let "inc" denote the number of incoming connections 330; "out" denote the number of outgoing connections. The fluid flows into the node through perforations and connections, so the total mass flow rate into the node is:

$$\left( \sum_{j}^{inc} q_{Tjr} + \sum_{p}^{perf} \sum_{k}^{nc} q_{pkr} \right)$$

where $q_{Tjr}$ is the total mass flow rate from connection j into node r, and $q_{pkr}$ is the mass flow rate of component k from perforation p into the node.

Let $x_{ijr}$ denote the composition of component i in the incoming flow into a node r through connection j; and let $x_{ir}$ be the composition of component i in the total incoming flow into node r. For a component i, the component's mass flow rate out of the node is:

$$x_{ir} \left( \sum_{j}^{inc} q_{Tjr} + \sum_{p}^{perf} \sum_{k}^{nc} q_{pkr} \right)$$

The incoming mass flow rate for component i is:

$$\sum_{j}^{inc} x_{ijr} q_{Tjr} + \sum_{p}^{perf} q_{pir}$$

The mass balance equation for component i is then $$R = \sum_{j}^{inc} x_{ijr} q_{Tjr} + \sum_{p}^{perf} q_{pir} - x_{ir} \left( \sum_{j}^{inc} q_{Tjr} + \sum_{p}^{perf} \sum_{k}^{nc} q_{pkr} \right) = 0 \tag{e21}$$

and the corresponding Jacobian derivatives are $$\frac{\partial R}{\partial x_{ir}} = -\left( \sum_{j}^{inc} q_{Tjr} + \sum_{p}^{perf} \sum_{k}^{nc} q_{pkr} \right) \tag{e22}$$

$$\frac{\partial R}{\partial x_{ijr}} = q_{Tjr} \tag{e23}$$

$$\frac{\partial R}{\partial q_{Tjr}} = x_{ijr} - x_{ir} \tag{e24}$$

$$\frac{\partial R}{\partial q_{pkr}} = \begin{cases} 1 - x_{ir} & \text{if } k == i \\ -x_{ir} & \text{if } k \neq i \end{cases} \tag{e25}$$

The equations (1) will include the mass balance equations for the components i=1, . . . , nc−1.

The example of FIG. 7 shows the Jacobian for two nodes such as in model 680. One of the nodes is node 325, also shown as node 1, whose equations correspond to the rows marked (e21), (e21), and (e27). The corresponding variables are shown in the heading row as $q_{T1}$ (total mass flow rate from node 1 to node 2), $x_{11}$ (composition of component 1 at node 1), $x_{21}$ (composition of component 2 at node 1).

The other node is a bottom-hole node 2, corresponding to the last three rows. The corresponding variables are $q_{T2}$ (total mass flow rate out of node 2), $x_{21}$ (composition of component 1 at node 2), $x_{22}$ (composition component 2 at node 2). FIG. 7 is not limited to model 680 in applicability.

The mass balance equation may be simpler if there is only one incoming connection and one outgoing connection and the node has no perforations; the equation becomes:

$$R = x_{up} - x_{dw} = 0 \tag{e26}$$

where $x_{up}$ is the composition of component i at the upstream node of the incoming connection into node r, and $x_{dw}$ is the composition of component i at the node r. See the rows marked with (e26) near the bottom of FIG. 7 for example.

The total mass balance equation equates the incoming and outgoing mass flow rates at each node r as follows:

$$R = \sum_{j}^{inc} q_{Tjr} + \sum_{p}^{perf} \sum_{k}^{nc} q_{pkr} - \sum_{l}^{out} q_{Tlr} = 0 \tag{e27}$$

where $q_{Tlr}$ is the total mass flow rate from the node r into outgoing connection l. The derivatives are $$\frac{\partial R}{\partial q_{Tjr}} = 1 \tag{e28}$$

$$\frac{\partial R}{\partial q_{Tlr}} = -1 \tag{e29}$$

$$\frac{\partial R}{\partial q_{pkr}} = 1 \tag{e30}$$

The mass transfer between a cell 320 with a perforation 134 and a wellbore node 325 is governed by the perforation equation as follows (here we assume that the perforations are producing, not injecting; the index r identifies the reservoir's cell 320 adjacent to the perforation):

$$q_{pk} = C\Delta\Phi \sum_{n=1}^{phase} \lambda_{nr}\rho_{nr}z_{knr} \quad \text{(e31)}$$

$$\Delta\Phi = P_r - P_w + \gamma_r(D_w - D_r) \quad \text{(e32)}$$

Here $q_k$ is the mass flow rate from perforation p (cell 320) into node 325; C is a user defined constant; $\lambda_{nr}$ is the mobility of phase n in perforation cell 320 identified by index r; $\rho_{nr}$ is the density of phase n in the same cell; $z_{knr}$ is the mass fraction of component k in phase n in the cell; $P_r$ is the pressure in the same cell; $P_w$ is the pressure at node 325; $D_r$ and $D_w$ are the depths of cell 320 and node 325 respectively; and $\gamma_r$ is the hydrostatic pressure gradient, so that the product $\gamma_r(D_w-D_r)$ represents the difference in pressure due to the fluid head.

For the first three rows of FIG. 7, marked (e31), the variables in equation (e31) are expressed in terms of primary variables: pressure in perforated grid block 320, and $m_i$—the mass of component i in perforated grid block 320.

The primary variables are:

1. In the network domain (i.e. in wells, and thus in the overlap between G1 and G2, and possibly in the surface network and thus in group G2):

$q_T$ (total flows on various connection);
    $x_i$ (compositions of components i on connections); and
    P (pressures).

2. In the reservoir domain (i.e. in the reservoir cells 320, thus in group G1):

$m_i$ is the mass of component i in the perforated grid block 320;
    P (pressures).

3. At the interface between these two domains (at perforation nodes 325, thus in group G1):

$q_{pk}$ (the mass flow rate of component k through perforation p).

In equation (8):

The $A_{wr}$ rows correspond to equations (e10), (e15), (e16), (e17), (e18).

The $A_{fw}$ rows correspond to some of the same equations, and possibly other equations (not shown) for the surface network.

The $A_{rr}$ rows correspond to mass balance equations for each cell, and a volume balance for each cell (fluid volume=pore volume); these equations can be well known equations, and are not shown herein.

In the following example illustrating a solution of equations (8) for the well model 680, we will show how to eliminate $q_T$ and $q_{pk}$, and how to reduce the resulting linear system, in which the primary variables are $x_i$, P in the network domain and $m_i$, P in the reservoir domain, to a pressure only system. This example includes a single phase with three components. The Newton-Raphson Jacobian matrix at the network side is shown in FIG. 7 (FIG. 7 is not limited to model 680 but applies to other models also). In other words, FIG. 7 shows the portion $A_{rw}$
$A_{ww}$ of equation (8). In equation (e4), the function f is treated explicitly (its value is the value obtained in the previous iteration, or is an initial value if this is the first iteration) so its derivatives are zero. The flow rates $q_{pk}$ at perforation connections and total flow rates $q_{Tk}$ at all other network connections are eliminated as shown in FIG. 8, and only the rows initially based on the mass balance equations remain.

In FIG. 7, the equation number for each row is specified in the right column. In FIGS. 8-9, the rows have been added or subtracted as described below, but the right column provides the same equation numbers as in the corresponding rows of FIG. 7 so the rows are easily identified. The cell 320 in model 680 is assumed to have one perforation, and the first three rows in FIG. 7 correspond to equations (e31). The primary variables are given at the top of the figures, so the variables in equations (e31) are expressed in terms of the primary variables, i.e. the masses $m_1$ and $m_2$ of components 1 and 2 in the grid block 320 and the pressure P in the grid block. $P_1$ in FIG. 7 is the pressure at the wellbore node 1 ($P_w$ in equations (e31)); $P_2$ is the pressure at the next node 2 up the wellbore.

The c values in the first three columns in the (e31) rows in FIG. 7 represent the appropriate derivatives.

The values $T_1$, $T_2$, $T_3$ are:

$$T_k = -C\sum_{n=1}^{phase} \lambda_n \rho_n z_{kn}$$

where k=1, 2, 3. See equation (e31); the r index is omitted for simplicity.

The variable $q_{T1}$ is the mass flow rate on the connection between nodes 1 and 2 (i.e. nodes 320 and 324BH) in model 680. The variable $q_{T2}$ is the mass flow rate from node 2. The variables $x_{ij}$ are compositions at different nodes; the first index, i, is the component number, and the second index is the node number. Thus, $x_{12}$ is the composition of component 1 at node 2. The component number nc=3, and the primary variables include the compositions for the first two components only.

In the row for equation (e4), the values $\varepsilon$, $h_{11}$, $h_{21}$ depend on the function f in the equation. Suitable equations are well known. Of note, f can be treated implicitly or explicitly.

As noted above, np=1. The variables $P_1$ and $P_2$ are pressures at nodes 1 and 2 respectively.

In the row (e17), the constraint equation can be for node 2. In this case, $x_k$ indicates $x_{k2}$, and $q_k$ are given by equation (e6), i.e. $q_k = x_{k2}q_{T2}$. The volume flow rates $Q_n$ are on the connection from node 2 to the surface network. As noted above, FIGS. 7-10 have a wider applicability than model 680.

Of note, the columns $x_{12}$, $x_{22}$ (node 2 compositions) have zero entries in the mass balance rows (e21), (e21), (e27) for node 1. However, the columns $x_{11}$, $x_{21}$ (node 1 compositions) have some non-zero entries in the mass balance rows (three last rows (e26), (e26), (e27)) for node 2. It is desirable to eliminate these non-zero entries to construct a pressure matrix from the mass balance equations.

In FIG. 8, the total mass flow rates $q_{T2}$ and the perforation connection flow rates $q_{pk}$ have been eliminated. FIGS. 8-10 show only the mass balance equation rows for nodes 1 and 2. In FIG. 9, the mass balance equations at the perforation node 1 (the first three rows, labeled respectively (e21), (e21), (e27)) have been added to the respective equations of the reference node (the bottom-hole node 2 in this example), i.e. rows 1, 2, 3 are added to respective rows 4, 5, 6 to cancel the composition coupling terms between these two nodes. Before the addition, the rows 4 and 5 are multiplied by $$-\Sigma_p^{perf}\Sigma_k^{nc}q_{pk}$$

Now the columns for node 1 compositions $x_{11}$, $x_{21}$ have zero entries for node 2 (in the last three rows). The columns for node 2 compositions $x_{12}$, $x_{22}$ retain zero entries for node 1 (in the first three rows).

At the reference node 2 (324BH), the composition terms only remain at the diagonal block as shown below:

$$\begin{bmatrix} -\sum_p^{perf}\sum_k^{nc} q_{pk} & & \\ & -\sum_p^{perf}\sum_k^{nc} q_{pk} & \\ q_{T2}\sum_{n=1}^{np} a_n\left(\frac{\partial Q_n}{\partial q_1} - \frac{\partial Q_n}{\partial q_{nc}}\right) \Big/ & q_{T2}\sum_{n=1}^{np} a_n\left(\frac{\partial Q_n}{\partial q_2} - \frac{\partial Q_n}{\partial q_{nc}}\right) \Big/ & \\ \sum_{n=1}^{np}\sum_{k=1}^{nc} x_k & \sum_{n=1}^{np}\sum_{k=1}^{nc} a_n \frac{\partial Q_n}{\partial q_k} x_k & \end{bmatrix}$$

We can eliminate the nonzero composition terms in the last row by left-multiplying the last three rows by the matrix $$\begin{bmatrix} 1 & & \\ & 1 & \\ \omega_1 & \omega_2 & 1 \end{bmatrix}$$

where $$\omega_1 = \left[ q_{T2} \sum_{n=1}^{np} a_n\left(\frac{\partial Q_n}{\partial q_1} - \frac{\partial Q_n}{\partial q_{nc}}\right) \Big/ \sum_{n=1}^{np}\sum_{k=1}^{nc} a_n \frac{\partial Q_n}{\partial q_k} x_k \right] \Big/ \left[ \sum_p^{perf}\sum_k^{nc} q_{pk} \right] \quad (e33)$$

$$\omega_2 = \left[ q_{T2} \sum_{n=1}^{np} a_n\left(\frac{\partial Q_n}{\partial q_2} - \frac{\partial Q_n}{\partial q_{nc}}\right) \Big/ \sum_{n=1}^{np}\sum_{k=1}^{nc} a_n \frac{\partial Q_n}{\partial q_k} x_k \right] \Big/ \left[ \sum_p^{perf}\sum_k^{nc} q_{pk} \right] \quad (e34)$$

This means that the component mass balance equations (26) for node 2 are added to the total mass balance equation (27) for node 2 with respective factors $\omega_1$ and $\omega_2$ to eliminate the node-2 component terms $x_{i2}$ and $\omega_2$ in the total mass balance equation. The node-1 component terms remain zero.

The resulting matrix is shown in FIG. 10. Thus, the pressure matrix at the well side based on reference node 2 is obtained, as shown in the last row in FIG. 10. In other words, for the well nodes, only the pressure variables remain. In other embodiments, similar results are achieved by using node 1 as the reference node, and in particular all the component terms are eliminated in the total mass flow equation for node 1.

With regard to the embodiment of FIG. 10, since $$q_{T2} = \sum_p^{perf}\sum_k^{nc} q_{pk} \quad (e35)$$

we have $$\omega_1 = \sum_{n=1}^{np} a_n\left(\frac{\partial Q_n}{\partial q_1} - \frac{\partial Q_n}{\partial q_{nc}}\right) \Big/ \sum_{n=1}^{np}\sum_{k=1}^{nc} a_n \frac{\partial Q_n}{\partial q_k} x_k \quad (e36)$$

$$\omega_2 = \sum_{n=1}^{np} a_n\left(\frac{\partial Q_n}{\partial q_2} - \frac{\partial Q_n}{\partial q_{nc}}\right) \Big/ \sum_{n=1}^{np}\sum_{k=1}^{nc} a_n \frac{\partial Q_n}{\partial q_k} x_k \quad (e37)$$

Next we explain the physical meaning behind this pressure matrix. For an oil rate constraint in a black-oil system $$a_1 = 1, a_2 = 0, a_3 = 0$$

The denominator in equations (e36) and (e37) can be rewritten as $$\sum_{k=1}^{nc} \frac{\partial Q_1}{\partial q_k} x_k = \sum_{k=1}^{nc} \frac{\partial Q_1}{\partial q_k} \frac{q_k}{q_T} = \frac{Q_1}{q_T} \quad (e38)$$

and the multipliers in equations (e36) and (e37) can be simplified as $$\omega_1 = \frac{\partial Q_1}{\partial q_1} \frac{q_T}{Q_1} \quad (e39)$$

$$\omega_2 = \frac{\partial Q_1}{\partial q_2} \frac{q_T}{Q_1} \quad (e40)$$

Plugging equations (e39) and (e40) into the last row in FIG. 10, the pressure coefficient at the reference node 2 (the $P_1$ coefficient) can be reorganized as follows:

$$\begin{aligned} P_{ww} &= -T_1 - T_2 - T_3 - \omega_1[(x_{11}-1)T_1 + x_{11}T_2 + x_{11}T_3] - \\ & \quad \omega_2[x_{21}T_1 + (x_{21}-1)T_2 + x_{21}T_3] - \\ &= (1 + \omega_1 x_{11} + \omega_2 x_{21})(T_1 + T_2 + T_3) + \omega_1 T_1 + \omega_2 T_2 \\ &= \omega_1 T_1 + \omega_2 T_2 \\ &= \frac{q_T}{Q_1}\left(\frac{\partial Q_1}{\partial q_1} T_1 + \frac{\partial Q_1}{\partial q_2} T_2\right) \end{aligned} \quad (e41)$$

where $$T_k = -\sum_{n=1}^{phase} \lambda_n \rho_n z_{kn} \quad (e42)$$

See equation (e31); the r index is omitted for simplicity.

It is evident that the pressure coefficient ($P_1$ coefficient) is the sum of mobility of each component weighted by its contribution in the total oil phase flow rate, which is consistent with a simple well model. The only difference is that the pressure matrix is scaled by the constant $-q_T/Q_1$.

The coupling matrix between the reservoir and the well (the left three columns in the bottom row of FIG. 10) is $$P_{wr} = \frac{q_T}{Q_1} \quad (e43)$$

$$\left[ \frac{\partial Q_1}{\partial q_1} c_{11} + \frac{\partial Q_1}{\partial q_2} c_{21} \quad \frac{\partial Q_1}{\partial q_1} c_{12} + \frac{\partial Q_1}{\partial q_2} c_{22} \quad \frac{\partial Q_1}{\partial q_1} c_{1p} + \frac{\partial Q_1}{\partial q_2} c_{2p} \right]$$

As can be seen in this example in FIGS. 7 and 8, the composition coupling terms $x_{i1}$ in the off-diagonal sub-matrix of downstream node 2 are the negative of the composition coupling terms in the diagonal sub-matrix of its upstream node 1 when f in the hydraulics equation (e4) is treated explicitly. ("Off diagonal" denotes herein the compositions at one node in the rows for another node; "diagonal" denotes composition at a node in the rows of the node itself.) Of note, the rows $(-\Sigma_p^{perf}\Sigma_k^{nc} q_{pk}, 0)$ and $(0, -\Sigma_p^{perf}\Sigma_k^{nc} q_{pk})$ in the (e21) lines of FIG. 7 are the same, up to a constant multiple, as rows (1, 0) and (0, 1) in the (e26)

lines. Those composition coupling terms in the first nc-1 rows (the component mass balance equations) for each node are the total incoming flow rate at the downstream node. This should be true for all nodes in a gridded well if there is no cross-flow or constraints applied to those nodes but the bottom-hole node. We will show this on the following example.

FIG. 11 shows the Jacobian matrix at the wellbore side (the portion $$\begin{bmatrix} A_{rw} \\ A_{ww} \end{bmatrix}$$

in equation (8)) after elimination of the total flow rates $q_{Tk}$ and the perforation connection flow rates $q_{pTi}$ (i.e. at the stage of FIG. 8) for the model 694 with a rate constraint applied to node 4. The first three rows correspond to the mass balance equations (21), (27) for node 1; the next three rows correspond to the mass balance (MB) equations (21), (27) for node 2; the next three rows correspond to the MB equations (21), (27) for node 3; the last three rows correspond to the mass balance equation (21), (27) for node 4. For each node, the first two MB equations are for respective components 1 and 2; the last MB equation is for the total flow through the node.

The columns $P_1$, $P_2$, $P_3$ in the left half denote pressures in the corresponding perforation cells 320. The same symbols in the right half refer to pressures at the respective nodes 325.

FIGS. 12, 13, and 14 show how the pressure matrix is generated. FIGS. 12-14 show only the rows corresponding to the mass balance equations for node 4 (last three rows in FIG. 11). For these figures, we define:

$$\widetilde{T_{1J}} = (x_{1j}-1)T_{1j}+x_{1j}T_{2j}+x_{1j}T_{3j}$$

$$\widetilde{T_{2J}} = x_{2j}T_{2j}+(x_{2j}-1)T_{2j}+x_{2j}T_{3j}$$

$$\widetilde{T_j} = -T_{1j}-T_{2j}-T_{3j}$$

where j is the perforation index, and T is calculated using equation (e42).

In FIG. 12, the MB equations for nodes 1, 2, and 3 (first nine rows) were added to the equations at the bottom-hole node 4 (three last rows) to obtain the matrix of FIG. 12. More particularly, the first equations (for component 1) for nodes 1, 2, 3 are added to the first equation for node 4; the second equations (for component 2) for nodes 1, 2, 3 are added to the second equation for node 4; and the third equations (for total flow) for nodes 1, 2, 3 are added to the third equation for node 4. In the composition coupling terms, corresponding to the $$\frac{\partial R}{\partial x}$$

columns, the terms $$-\frac{h}{\varepsilon}\Delta x$$

remain which are similar to each other. In these terms, the values h, ε are the hydraulics derivatives with respect to the composition and total flow rate, and are calculated using equations (e13) and (e14), respectively. Δx is the difference in component mass composition between a node and its upstream node. As in the lumped well model, if the pressure gradient is treated explicitly, i.e. the function f in equation (e4) is evaluated using results from the previous iteration, all those derivatives are zeroes, so all the composition columns in FIG. 12 are zeroes. Then all the pressure columns are lumped (added) to the last column, corresponding to the pressure at the bottom-hole node, as shown in FIG. 13. Finally we use the same method as in the lumped well model 680 to eliminate the diagonal composition terms, corresponding to the last three columns in FIG. 13, and the last row in FIG. 14 is taken as the pressure coefficients for the well node 4, which has the pressure as the sole unknown for node 4 at the well side. The pressure unknowns are decoupled from other unknowns at the well side.

In the previous two examples, if the function f in hydraulics equation (e4) is treated explicitly or the pressure gradient is taken constant, we should have $$\delta P_i = \delta P_{ref} \tag{e44}$$

and $$\frac{\partial R}{\partial P_i} = \frac{\partial R}{\partial P_{ref}} \tag{e45}$$

where ref denotes the reference node. We can apply the same approach to the coupling terms from the reservoir to the well side, and move those terms $$\frac{\partial R}{\partial P_i}$$

to the column corresponding to the reference node, as shown in FIG. 16. Note that in those coupling terms, $$\frac{\partial R}{\partial x} = 0$$

for producing perforations. At the wellbore side, the mass coupling terms $$\frac{\partial R}{\partial m}$$

can be eliminated using the reduced mass balance equations at the reservoir side, and new coupling terms between network and reservoir are introduced, as shown in FIG. 16.

More particularly, FIG. 15 shows a global matrix structure for implicit formulation with implicit wells and surface network. Thick lines divide the matrix into nine blocks which correspond to the nine blocks of the matrix of equation (7), i.e. the blocks $A_{rr}$, $A_{rw}$, etc. The "x" terms indicate possible non-zero elements. The matrix of FIG. 15 has a number of cells some of which are empty (corresponding to zero elements) and the others contain four x's, indicating that the cells may have any structure.

FIG. 16 shows the matrix structure for the case of FIG. 15 after elimination of mass coupling terms in the producing perforation connections. Only four blocks are shown, as in the matrix for equation (8), i.e. the blocks $A_{rr}$, $A_{rw}$, $A_{wr}$, $A_{ww}$. In the $A_{ww}$ block, the pressures are the only non-zero elements. The "y" terms in the $A_{wr}$ block indicate fill-ins, i.e. possible non-zero elements generated by linear combinations of equations.

The coefficient matrix, which is derived from mass balance equations (MBEs), at the reservoir side can be reduced to a pressure only matrix, shown in FIG. 17 and having the following form:

$$P_{rr} = RA_{rr}P \qquad (e46)$$

where the prolongation matrix P and the restriction matrix R are defined as follows:

$$P = \begin{bmatrix} e_1 & & \\ & \ddots & \\ & & e_N \end{bmatrix} \qquad (e47)$$

where $$e_i = \begin{bmatrix} 0 \\ 0 \\ 1 \end{bmatrix}$$

The restriction matrix R is a diagonal matrix as follows $$R = P^T \begin{bmatrix} L_1^{-1} & & \\ & \ddots & \\ & & L_N^{-1} \end{bmatrix} \qquad (e48)$$

where L is the lower matrix of an LDU factorization of the diagonal sub matrix Arr, i.e.

$$\text{diag}(A_{rr}) = \begin{bmatrix} L_1 D_1 U_1 & & \\ & \vdots & \\ & & L_N D_N U_N \end{bmatrix} \qquad (e49)$$

We finally get a global pressure linear system including reservoir and wells, as shown in FIG. 17. More particularly, we get:

$$\begin{bmatrix} P_{rr} & P_{rw} \\ P_{wr} & P_{ww} \end{bmatrix} \begin{bmatrix} u_r \\ u_w \end{bmatrix} = \begin{bmatrix} d_r \\ d_w \end{bmatrix} \qquad (e50)$$

Due to the Jacobian processing described above, the approximation errors in generating the approximate solutions by Newton-Raphson or other methods are hopefully reduced, which may lead to a better pressure solution and hence a better overall solution of equation (7).

In the previous two examples, we assume there is a rate constraint at the well connection. When it is a pressure constraint, as shown in equation (e15), or there is no constraints at all (a constraint might be at the top of the surface network), the method to construct the pressure matrix is similar and simpler. The multipliers defined in equations (e33) and (e34) are all zeroes.

The Jacobian conditioning described above can be used in many simulation schemes. One example is illustrated in FIG. 18. At step 1810, the equations (1) are selected, i.e. $F(\text{Var}_{i,j,k,l})=0$, to include mass balance equations for a selected set of wellbore nodes (such as nodes 1 and 2 in model 680, or nodes 1-4 in model 694). In some embodiments, these nodes and the connections between them form a connected graph. In some embodiments, the nodes are consecutive nodes in a path of fluid. In some embodiments, the set of nodes includes nodes of surface network 130 and/or reservoir cells 320. In the examples above only one set of nodes (such as nodes 1 and 2) was considered, but multiple sets of nodes can be provided. In each set, a reference node is chosen, and the mass balance equations of the other nodes are added to the mass balance equations of the reference node, and other processing is performed for each set as described above, to eliminate compositions in the reference node mass balance equations.

The mass balance equations include, for each node in the set, equations for individual components and/or equations for total mass balance. Perforation equations may also be present.

Figure 4:
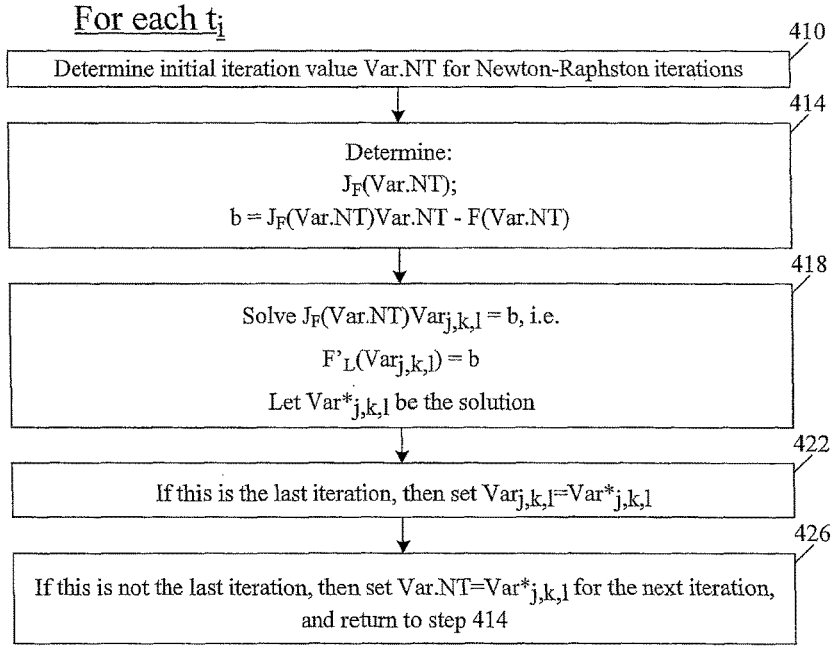
FIG. 4 is a flow chart of a Newton-Raphson method used to simulate an oil or gas field and production facilities according to prior art.

The equations (1) are then solved for each time period $t_i$ by the Newton-Raphson method as follows. At step 410 (same as in FIG. 4), an initial iterative value Var.NT is chosen. At step 414 (same as in FIG. 4), the Jacobian is determined at the Var.NT value, and the RHS term "b" is determined for the equation:

$$J_F(\text{Var.}NT)\text{Var}_{j,k,l} = b \qquad (e50A)$$

At step 1820, the Jacobian is processed to eliminate some non-pressure coefficients by combining the mass balance equations in each set of nodes, and possibly combining different columns, as illustrated above in connection with FIGS. 7-17 and further explained below. Let us denote the resulting "modified Jacobian" as JM (i.e. JM may include the matrix of FIG. 10 or 14), and denote the corresponding variables as VarM (the variables can change since pressure columns may have been added and some columns may have been dropped; e.g. the columns corresponding to the total flow rates in the connections and the perforation flow rates may have been dropped); and denote the corresponding right-hand side as bM. The equation (e50A) then becomes:

$$JM(\text{VarM.}NT)\text{VarM}_{j,k,l} = bM \qquad (e50B)$$

At step 418 (as in FIG. 4), the computer system solves the equations (e50B), possibly (but not necessarily) using a Schwarz method illustrated in FIG. 5. Let us denote the solution $\text{VarM}^*_{j,k,l}$.

At step 1824, the original variables' values $\text{Var}^*_{j,k,l}$ are obtained from $\text{VarM}^*_{j,k,l}$. The values $\text{Var}^*_{j,k,l}$ are thus a solution of equation (e50A), and this solution is used as the next iterative value for Var.NT, and control returns to step 414, or alternatively the Newton-Raphson method is stopped (steps 422, 426 are as in FIG. 4).

Many variations are possible. For example, the modified Jacobian computation steps 414, 1820 can be performed in generalized form, without plugging in the value Var.NT, as in fact is illustrated in FIGS. 7-14. Then at each iteration, the value Var.NT can be plugged into the generalized expression for the modified Jacobian and modified right-hand side to determine the equation (e50B).

Figure 19:
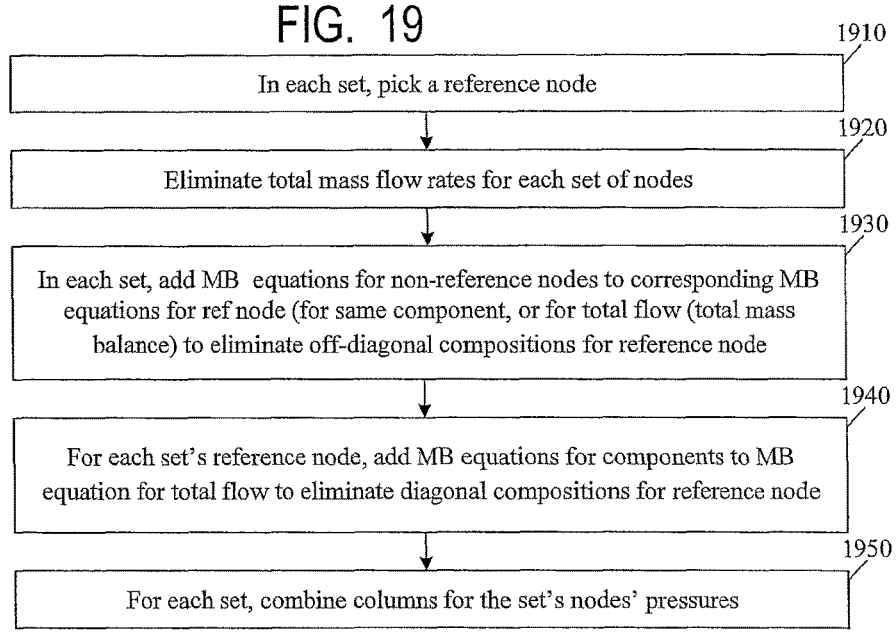

FIG. 19 illustrates some embodiments of the Jacobian processing step 1820. At step 1910, for each set of nodes, a reference node is chosen. In the examples discussed above in connection with models 680 and 694, the reference node was the bottom-hole node, but any other node in the set could be used instead. In some embodiments, the reference node is such that the flow into the reference node is made up of flows from the other nodes of the set, or such that the flow out of the reference node is made up of flows into the other nodes of the set.

At step 1920, the total mass flow variables $q_T$ are eliminated (as in FIG. 8) for the connections within each set. Some rows can be removed from the Jacobian.

At step 1930, within each set of nodes, the mass balance equations for the non-reference nodes are added to the corresponding mass balance equations for the reference node. In particular, the mass balance equations for each component k are added to the reference node's mass balance equation for the same component k; the total mass balance equations (for the total flow through each non-reference node) are added to the reference node's total mass balance equation. The equations may have to be multiplied by some factors before the addition. The factors depend on the equations (1) and the choice of primary variables. The addition is performed so as to eliminate the off-diagonal mass flow variables (e.g. compositions) in the reference node's mass balance equations.

At step 1940, the reference node's MB (mass balance) equations are combined to eliminate the diagonal compositions in the reference node's MB equations. This operation can be expressed as left-multiplying the reference node's MB equations by the matrix $L^{-1}$ where L is the lower matrix in the LU (lower-upper) factorization of the square matrix corresponding to the diagonal pressure and composition portion of the reference node's MB equations. An example of the $L^{-1}$ matrix is described above in connection with equations (e33), (e34), i.e. the matrix:

$$L^{-1} = \begin{bmatrix} 1 & & \\ & 1 & \\ \omega_1 & \omega_2 & 1 \end{bmatrix}$$

At step 1950, the pressure columns may be combined as explained above in connection with equations (e44), (e45).

In some embodiments, some of these operations are omitted. For example, step 1950 and/or 1940 can be omitted.

As noted above, there are many ways to solve the modified Jacobian equation at step 418 in FIG. 18. An exemplary method, using the multiplicative Schwarz method of FIG. 6, is a two-stage preconditioning method performed as follows. The network equations (9) are solved at the pre-iteration phase (for the initial iterative value x.sc shown at step 620 in FIG. 6), and equations (9) are solved again at the end of each iteration to maintain the network residual (the residual of (9)) always at zero in the GMRES calculation. The preconditioning procedure consists of the following steps:

Pre-Iteration
1) Initialize $x_r=0$
2) Solve equation (9), i.e.

$$\begin{bmatrix} x_w \\ x_f \end{bmatrix} = \begin{bmatrix} A_{ww} & A_{wf} \\ A_{fw} & A_{ff} \end{bmatrix}^{-1} \begin{bmatrix} b_w \\ b_f \end{bmatrix},$$

to determine $x_w$ and $x_f$.
3) Update residual in equation (8):

$$\begin{bmatrix} b_r \\ b_w \end{bmatrix}_1 = \begin{bmatrix} b_r \\ b_w \end{bmatrix} - \begin{bmatrix} A_{rr} & A_{rw} \\ A_{wr} & A_{ww} \end{bmatrix} \begin{bmatrix} 0 \\ x_w \end{bmatrix} - A_{wf} x_f$$

Schwarz Iteration, by k, until Convergence
1) Solve equation (8) using a CPR method (Constrained Pressure Residual) using the pressure matrix (e46) as explained below.
2) Update residual in equation (9):

$$\begin{bmatrix} b_w \\ b_f \end{bmatrix}_{k+1} = \begin{bmatrix} b_w \\ b_f \end{bmatrix}_k - \begin{bmatrix} A_{ww} & A_{wf} \\ A_{fw} & A_{ff} \end{bmatrix} \begin{bmatrix} \delta x_w \\ 0 \end{bmatrix} - A_{wr} \delta x_r$$

3) Solve equation (9), i.e.

$$\begin{bmatrix} \delta x_w \\ \delta x_f \end{bmatrix}_{k+1} = \begin{bmatrix} A_{ww} & A_{wf} \\ A_{fw} & A_{ff} \end{bmatrix}^{-1} \begin{bmatrix} b_w \\ b_f \end{bmatrix}_{k+1}$$

4) Update residual in equation (8)

$$\begin{bmatrix} b_r \\ b_w \end{bmatrix}_{k+1} = \begin{bmatrix} b_r \\ b_w \end{bmatrix}_k - \begin{bmatrix} A_{rr} & A_{rw} \\ A_{wr} & A_{ww} \end{bmatrix} \begin{bmatrix} 0 \\ \delta x_w \end{bmatrix} - A_{wf} \delta x_f$$

5) Compute the solution change $\delta x_r = \delta x_r + P\delta u_r$, where P is as in (e47). Compute the residual change $\delta b_r = b_r^{k+1} - b_r^k$. Feed $\delta x_r$, $\delta x_w$, $\delta x_f$, $\delta b_r$ to GMRES to update the solutions $x_r$, $x_w$, $x_f$.

Step 1) above, Solving Equation (8) by CPR Method:
1) Update the residual in equation (e50):

$$\begin{bmatrix} d_r \\ d_w \end{bmatrix} = \varpi \begin{bmatrix} b_r \\ b_w \end{bmatrix}_k$$

where $\overline{\omega}$ is a restriction matrix defined below.
2) Solve equation (e50):

$$\begin{bmatrix} P_{rr} & P_{rw} \\ P_{wr} & P_{ww} \end{bmatrix} \begin{bmatrix} \delta u_r \\ \delta u_w \end{bmatrix} = \begin{bmatrix} d_r \\ d_w \end{bmatrix}$$

3) Map the pressure solution to the full solution:

$$\begin{bmatrix} \delta x_r \\ \delta x_w \end{bmatrix} = \begin{bmatrix} \delta x_r \\ \delta x_w \end{bmatrix} + \eta \begin{bmatrix} \delta u_r \\ \delta u_w \end{bmatrix}$$

where $\eta$ a prolongation matrix defined below.
4) Update residual of equation (8):

$$\begin{bmatrix} b_r \\ b_w \end{bmatrix}_{k+1} = \begin{bmatrix} b_r \\ b_w \end{bmatrix}_k - \begin{bmatrix} A_{rr} & A_{rw} \\ A_{wr} & A_{ww} \end{bmatrix} \begin{bmatrix} \delta x_r \\ \delta x_w \end{bmatrix}$$

5) Solve equation (8):

$$\begin{bmatrix} A_{rr} & A_{rw} \\ A_{wr} & A_{ww} \end{bmatrix} \begin{bmatrix} \delta x_r \\ \delta x_w \end{bmatrix}_{k+1} = \begin{bmatrix} b_r \\ b_w \end{bmatrix}_{k+1}$$

The prolongation and restriction matrices are as follows:
$\varpi$ is the restriction matrix $$\varpi = \begin{bmatrix} R_r & \\ R_e & R_w \end{bmatrix} \quad (e51)$$

where $R_r$ is the restriction matrix on the reservoir domain, and is defined in Equation (e48). $R_w$ is the restriction matrix at the well side, and is defined as:

$$R_w = \begin{bmatrix} w_1 & & \\ & \ddots & \\ & & w_{nw} \end{bmatrix} \quad (e52)$$

and $w_i = [\omega_1 \ \omega_2 \ 1 \ \ldots \ \omega_1 \ \omega_2 \ 1]$ where $\omega_1$ and $\omega_2$ are determined using equations (e33) and (e34). Here nw is the number of wells. $R_e$ is an operation matrix accounting for the elimination of mass coupling terms as shown in FIGS. 14 and 16.

$\eta$ is the prolongation matrix:

$$\eta = \begin{bmatrix} P_r & \\ & P_w \end{bmatrix} \quad (e53)$$

$P_r$ is the prolongation matrix on the reservoir domain as defined in (e47). $P_w$ is the prolongation matrix on the well side:

$$P_w = \begin{bmatrix} E_1 & & \\ & \ddots & \\ & & E_{nw} \end{bmatrix} \quad (e54)$$

where $E_i$ for the well i is defined as:

$$E_i = \begin{bmatrix} 0 \\ 0 \\ 1 \\ \vdots \\ 0 \\ 0 \\ 1 \end{bmatrix}$$

Here the 0's correspond to the columns with composition unknowns, and the 1's correspond to the columns with pressure unknowns.

The invention is not limited to the embodiments described above. The invention includes modified Newton-Raphson and Schwarz methods. For example, in some Newton-Raphson modifications, the same Jacobian is used for a number of iterations. The invention is not limited to particular variables, and while the examples above used the compositions of nc-1 components and the mass total flow rates other variables can be used instead, e.g. mass flow rates for all the components can be used. Further, while the embodiments described above do not use volume flow rate equations (e.g. volume balance equations) on the network side, other embodiments use such equations on the network side and use volume flow rates and volume compositions (volume fractions of individual components) instead of (or together with) mass flow rates or mass compositions. Volume flow rate terms are eliminated from volume balance equations using techniques described above for mass balance equations.

Some embodiments provide a computer implemented method for determining a plurality of values (e.g. pressures, compositions, flow rates, etc.) in a facility comprising an oil and/or gas reservoir and a plurality of wellbores each of which has been made or is to be made, each wellbore providing one or more passages for fluid flow into or out of the reservoir. The method comprises:

obtaining, by a computer system, a data model (e.g. 680, 690, 694) which represents the reservoir and each wellbore, the model comprising one or more nodes at said facility, the nodes comprising one or more sets of nodes, each set comprising a single node or a plurality of interconnected nodes, at least one node in each set being in a wellbore. In some embodiments, a set contains just one node, and diagonal composition terms are eliminated as in step 1940; step 1920 may be omitted. Different sets may or may not have nodes in respective different wellbores or wellbore segments.

The method further comprises obtaining, by the computer system, a system of linear algebraic equations interrelating said values, said values being represented as variables in the equations, wherein said values include a pressure for each node in each set and include flow rate values (e.g. mass flow rates or mass compositions or volume flow rates or compositions) defined by flow rates into or out of the nodes in each set, and for each node the equations include a set of one or more equations with values at the node, wherein for at least one node of each set of nodes, the set of one or more equations comprises at least one equation with a pressure at the node and one or more flow rate values at the node;

performing, by the computer system, a linear transformation of the system of equations, the linear transformation comprising a linear transformation of the equations of each set of equations to eliminate at least one flow rate value from at least one equation in each set of equations, the linear transformation providing a transformed system of equations; and solving, by the computer system, the transformed system of equations for said values.

Some embodiments provide a computer implemented method for determining a plurality of values in a facility comprising an oil and/or gas reservoir and a plurality of wellbores each of which has been made or is to be made, each wellbore providing one or more passages for fluid flow into or out of the reservoir, the method comprising:

obtaining, by a computer system, a data model which represents the reservoir and each wellbore, the model comprising one or more nodes at said facility, the nodes comprising a set of one or more well nodes each of which is a node in at least one wellbore with no perforations along the wellbore between the node and a ground surface;

obtaining, by the computer system, a system of linear algebraic equations (e.g. Jacobian based) interrelating said values, said values being represented as variables in the equations, wherein for each well node, said values include at least one value at the well node;

solving, by the computer system, the system of the equations for said values, wherein solving the system comprises:

solving, by the computer system, equations obtained from a first subsystem of the system of said equations (for example, the first subsystem may be equations (8)), to obtain values including at least one value at each well node of said set and at least one value in the reservoir, or for differences between such values and their approximations (e.g. the differences may be $\delta x_r$, $\delta x_w$, $\delta x_f$ as indicated above);

solving, by the computer system, equations obtained from a second subsystem of the system of said equations (e.g. the second subsystem may be equations (9)), to obtain values including at least one value at each well node of said set and at least one value in the reservoir, or for differences between such values and their approximations;

wherein the first subsystem overlaps with the second subsystem, and at least one value of a well node of said set, or the corresponding difference between the value and its approximation, is solved for in both solving the first subsystem and solving the second subsystem;

wherein the method further comprises constructing, by the computer system, a solution of the system of the equations from solutions of the first and second subsystems.

Figure 2:
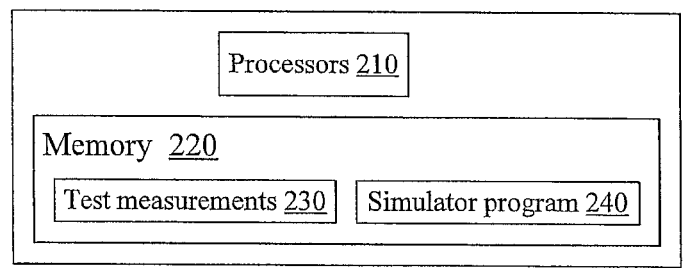
FIG. 2 is a block diagram of a computer system that can be used for simulation of oil or gas fields and production facilities according to prior art and some embodiments of the present invention.

The invention includes computer programs operable to cause a computer system (such the system of FIG. 2) to perform any of the methods described above. The invention includes computer program products, e.g. computer readable media or computer systems, comprising a computer program operable to cause a computer system to perform such methods. The computer programs can be stored on computer readable media, and can be transmitted over a computer network to a computer system and downloaded onto such media. The invention includes methods comprising network transmission of such computer programs. Other embodiments and variations are within the scope of the invention, as defined by the appended claims.

Some information related to the above disclosure can be obtained from the following documents incorporated herein by reference (no representation is being made as to whether or not the documents are prior art with respect to the present application):

U.S. patent application publication 2012/0022841 A1 (Jan. 26, 2012), inventor Appleyard.

Martin J. Gander et al., "An optimal block iterative method and preconditioner for banded matrices with applications to PDEs on irregular domains", Report 10-05-21, pages 1-27, May 2010, available in the World Wide Web at http://www.math.temple.edu/~szyld.

PCT application WO 2011/136861 A1 (Nov. 3, 2011), applicant EXXONMOBIL Upstream Research Company.

The invention claimed is:

1. A computer implemented method for performing a wellbore operation by determining a plurality of values in a facility comprising an oil and/or gas reservoir and a plurality of wellbores each of which has been made or is to be made, each wellbore providing one or more passages for fluid flow into or out of the reservoir, the method comprising:

obtaining, by a computer system, a data model which represents the reservoir and each wellbore, the model comprising one or more nodes at said facility, the nodes comprising one or more sets of nodes, each set comprising a single node or a plurality of interconnected nodes, at least one node in each set being in a wellbore;

obtaining, by the computer system, a system of linear algebraic equations interrelating said values, said values being represented as variables in the equations, wherein said values include a pressure for each node in each set and include flow rate values defined by flow rates into or out of the nodes in each set, and for each node the equations include a set of one or more equations with values at the node, wherein for at least one node of each set of nodes, the set of one or more equations comprises at least one equation with a pressure at the node and one or more flow rate values at the node;

performing, by the computer system, a linear transformation of the system of equations, the linear transformation comprising a linear transformation of the equations of each set of equations to eliminate at least one flow rate value from at least one equation in each set of equations, the linear transformation providing a transformed system of equations, wherein eliminating the at least one flow rate value comprises:

in each set of nodes, selecting a reference node;

eliminating total mass flow rates for each set of nodes;

in each set of nodes, adding mass balance equations for non-reference nodes to corresponding mass balance equations for reference nodes, thereby eliminating off-diagonal compositions for the reference nodes;

for each reference node in a set of nodes, adding mass balance equations for components to mass balance equations for total flow, thereby eliminating diagonal compositions for the reference node; and for each set of nodes, combining columns for pressures at the nodes in each set;

solving, by the computer system, the transformed system of equations for said values;

generating a computer simulation of an oil or gas reservoir or production facility using the transformed system of equations;

using the computer simulation generated using the transformed system of equations to select at least one of a wellbore location, injection chemicals, wellbore shape, wellbore dimension, wellbore pipe network, wellbore pump network, wellbore drilling schedule, or wellbore production schedule, thereby designing a production facility; and drilling, completing, or producing from the designed production facility.

2. The method of claim 1 wherein the flow rate values comprise mass compositions of all the components except one at the nodes of the set, and comprise total mass flow rates into and/or out of each node of each set.

3. The method of claim 1 wherein the flow rate values comprise the mass flow rates of all the components into and/or out of each node of each set.

4. The method of claim 1 wherein for each set of nodes, the one or more equations comprise at least a balance equation for each node in the set, the balance equation being a mass balance equation or a volume balance equation, the balance equation representing a balance of total flow into and/or out of the node or a flow of at least one, but less than all, fluid components into and/or out of the node;

wherein performing the linear transformation comprises, for each set, linearly combining balance equations for different nodes, wherein in each linear combination of the balance equations for different nodes of the same set, each of the balance equations being combined represents the balance of the total flow, or each of the balance equations being combined represents the balance of a flow of the same one or more components as each other balance equation being combined.

5. The method of claim 4 wherein in the linear transformation, for each set of equations, the linear combination of the balance equations replaces the balance equation for one of the nodes of the corresponding set of nodes.

6. The method of claim 5 wherein each set of nodes comprises a reference node, and each set is such that the flow into the reference node is made up of flows from the other nodes of the set, or such that the flow out of the reference node is made up of flows into the other nodes of the set;
in the linear transformation, for each set of equations, the linear combination replaces the corresponding balance equation for the reference node.

7. The method of claim 6 wherein for at least one set of nodes, the corresponding one or more equations comprise a plurality of the balance equations for at least one node in the set, the plurality of the balance equations comprising a balance equation representing the balance of the total flow into and/or out of the node and comprising a balance equation representing a flow of one or more, but less than all, fluid components into and/or out of the node;
wherein performing the linear transformation comprises, for at least said at least one set of nodes, linearly combining the balance equations for said at least one node with each other, to eliminate at least one flow rate value in the balance equation representing the balance of the total flow of said at least one node.

8. The method of claim 1 wherein for at least one set of nodes, the corresponding one or more equations comprise a plurality of balance equations for at least one node in the set, each balance equation being a mass balance equation or a volume balance equation, each balance equation representing a balance of total flow into and/or out of the node or a flow of at least one component of the fluid into and/or out of the node;
wherein performing the linear transformation comprises, for at least said at least one set of nodes, linearly combining the balance equations for said at least one node with each other, to eliminate at least one flow rate value in the balance equation representing the balance of the total flow into or out of said at least one node.

9. The method of any one of claims 4-8 wherein each balance equation is a mass balance equation, and the flow rate values comprise mass compositions of all the components except one at the nodes of the set, and comprise total mass flow rates into and/or out of each node of each set.

10. The method of any one of claims 4-8 wherein each balance equation is a mass balance equation, and the flow rate values comprise mass flow rates of all the components into and/or out of each node of each set.

11. The method of any one of claims 1-8 wherein the one or more sets of nodes comprise two sets of nodes in respective two different wellbores.

12. A computer implemented method for performing a wellbore operation by determining a plurality of values in a facility comprising an oil and/or gas reservoir and a plurality of wellbores each of which has been made or is to be made, each wellbore providing one or more passages for fluid flow into or out of the reservoir, the method comprising:
obtaining, by a computer system, a data model which represents the reservoir and each wellbore, the model comprising one or more nodes at said facility, the nodes comprising a set of one or more well nodes each of which is a node in at least one wellbore with no perforations along the wellbore between the node and a ground surface;
obtaining, by the computer system, a system of linear algebraic equations interrelating said values, said values being represented as variables in the equations, wherein for each well node, said values include at least one value at the well node;
solving, by the computer system, the system of the equations for said values, wherein solving the system comprises:
in each set of well nodes, selecting a reference node;
eliminating total mass flow rates for each set of well nodes;
in each set of well nodes, adding mass balance equations for non-reference nodes to corresponding mass balance equations for reference nodes, thereby eliminating off-diagonal compositions for the reference nodes;
for each reference node in a set of well nodes, adding component mass balance equations to mass balance equations for total flow, thereby eliminating diagonal compositions for the reference node; and
for each set of well nodes, combining columns for pressures at the nodes in each set,
wherein the method further comprises:
constructing, by the computer system, a solution of the system of the equations from solutions of the first and second subsystems;
generating a computer simulation of an oil or gas reservoir or production facility using the solution of the system of equations;
using the computer simulation generated using the transformed system of equations to select at least one of a wellbore location, injection chemicals, wellbore shape, wellbore dimension, wellbore pipe network, wellbore pump network, wellbore drilling schedule, or wellbore production schedule, thereby designing a production facility; and
drilling, completing, or producing from the designed production facility.

13. A computer program product comprising a computer program operable to cause a computer system to perform the method according to any one of claims 1, 2, 3, 4, 5, 6, 7, 8, and 12.

14. A computer program product comprising a computer program operable to cause a computer system to perform the method according to claim 9.

15. A computer program product comprising a computer program operable to cause a computer system to perform the method according to claim 10.

16. A computer program product comprising a computer program operable to cause a computer system to perform the method according to claim 11.

* * * * *